US010408315B2

(12) United States Patent
Tsuchiya et al.

(10) Patent No.: US 10,408,315 B2
(45) Date of Patent: Sep. 10, 2019

(54) DRIVE POWER TRANSMISSION DEVICE AND CONTROL PROGRAM THEREFOR

(71) Applicant: KABUSHIKI KAISHA TOYOTA CHUO KENKYUSHO, Nagakute-shi, Aichi-ken (JP)

(72) Inventors: Eiji Tsuchiya, Nagakute (JP); Tomohiro Miyabe, Nagakute (JP)

(73) Assignee: KABUSHIKI KAISHA TOYOTA CHUO KENKYUSHO, Nagakute (JP)

(*) Notice: Subject to any disclaimer, the term of this patent is extended or adjusted under 35 U.S.C. 154(b) by 586 days.

(21) Appl. No.: 15/105,968

(22) PCT Filed: Dec. 17, 2014

(86) PCT No.: PCT/JP2014/006308
§ 371 (c)(1),
(2) Date: Jun. 17, 2016

(87) PCT Pub. No.: WO2015/093055
PCT Pub. Date: Jun. 25, 2015

(65) Prior Publication Data
US 2017/0009860 A1 Jan. 12, 2017

(30) Foreign Application Priority Data

Dec. 20, 2013 (JP) .................................. 2013-264150
Nov. 27, 2014 (JP) .................................. 2014-240169
Nov. 27, 2014 (JP) .................................. 2014-240170

(51) Int. Cl.
*F16H 33/06* (2006.01)
(52) U.S. Cl.
CPC .................................. *F16H 33/06* (2013.01)

(58) Field of Classification Search
CPC ............ F16H 33/06; F16H 33/00; F16H 33/08
See application file for complete search history.

(56) References Cited

U.S. PATENT DOCUMENTS 1,891,101 A * 12/1932 Le Count .............. H01H 3/3042
185/37
2,107,373 A * 2/1938 Edwards ................ F16H 27/10
235/1 R
(Continued)

FOREIGN PATENT DOCUMENTS

DE          2839824 A1      3/1980
JP       2009-299829 A      12/2009
(Continued)

OTHER PUBLICATIONS

Sep. 19, 2017 Office Action issued in Japanese Patent Applicatiion No. 2014-240170.
(Continued)

*Primary Examiner* — David M Fenstermacher
(74) *Attorney, Agent, or Firm* — Oliff PLC

(57) ABSTRACT

A drive power transmission device capable of transmitting drive power asynchronously with rotation of an input shaft. The drive power transmission device includes a first rotation shaft, a second rotation shaft, an elastic member, and a vibration element. One end of the elastic member is fixed to the second rotation shaft at a position spaced from its central axis, while the other end of the elastic member is fixed to the vibration element. The vibration element is capable of being placed in either one of a first state of being connected to the first rotation shaft and a second state of being disconnected from the first rotation shaft.

9 Claims, 19 Drawing Sheets

(56) References Cited

U.S. PATENT DOCUMENTS

| | | | | |
|---|---|---|---|---|
| 2,186,662 | A | * | 1/1940 | Berger .................. F16H 61/664 476/47 |
| 2,460,000 | A | * | 1/1949 | Flanagan .................. F16D 5/00 307/149 |
| 2,677,968 | A | * | 5/1954 | Hubner .................. F16H 29/16 74/112 |
| 2,886,976 | A | * | 5/1959 | Dean ........................ B06B 1/10 180/7.1 |
| 3,177,732 | A | * | 4/1965 | Swanson .................. H01H 5/06 74/112 |
| 3,246,530 | A | * | 4/1966 | Swanson ................ H01H 19/24 74/112 |
| 3,329,031 | A | * | 7/1967 | Maurer .................. B23Q 11/04 74/107 |
| 3,717,043 | A | * | 2/1973 | Cartier .................. F16H 31/004 200/38 B |
| 3,812,730 | A | * | 5/1974 | Yanagawa ............ G03B 21/113 192/23 |
| 4,003,267 | A | * | 1/1977 | Busch ...................... B41K 3/62 74/112 |
| 5,899,113 | A | * | 5/1999 | Badersbach ............. F16H 29/04 74/112 |
| 2011/0061983 | A1 | | 3/2011 | Sato et al. |
| 2014/0345999 | A1 | | 11/2014 | Kitayama et al. |

FOREIGN PATENT DOCUMENTS

| | | |
|---|---|---|
| JP | 2012-251619 A | 12/2012 |
| JP | 2013-092191 A | 5/2013 |
| JP | 2013-145045 A | 7/2013 |
| WO | 2012/009244 A2 | 1/2012 |

OTHER PUBLICATIONS

Feb. 28, 2017 Office Action issued in Japanese Patent Application No. 2014-240169.
Apr. 29, 2016 International Preliminary Report on Patentability issued in International Patent Application No. PCT/JP2014/006308.
Jan. 27, 2016 Written Opinion issued in International Patent Application No. PCT/JP2014/006308.
Aug. 6, 2015 Written Opinion issued in International Patent Application No. PCT/JP2014/006308.
Aug. 6, 2015 Search Report issued in International Patent Application No. PCT/JP2014/006308.

* cited by examiner

[Fig. 1]
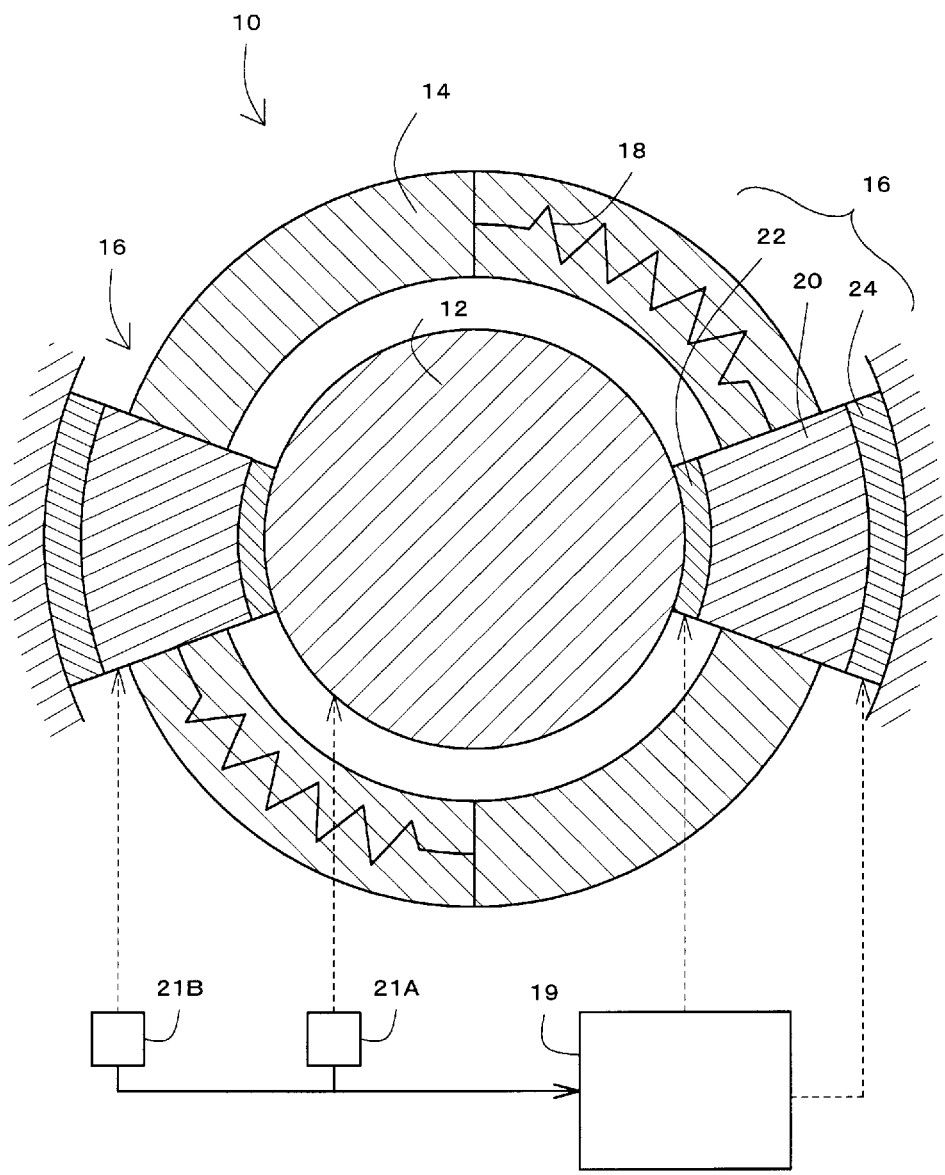

[Fig. 2]
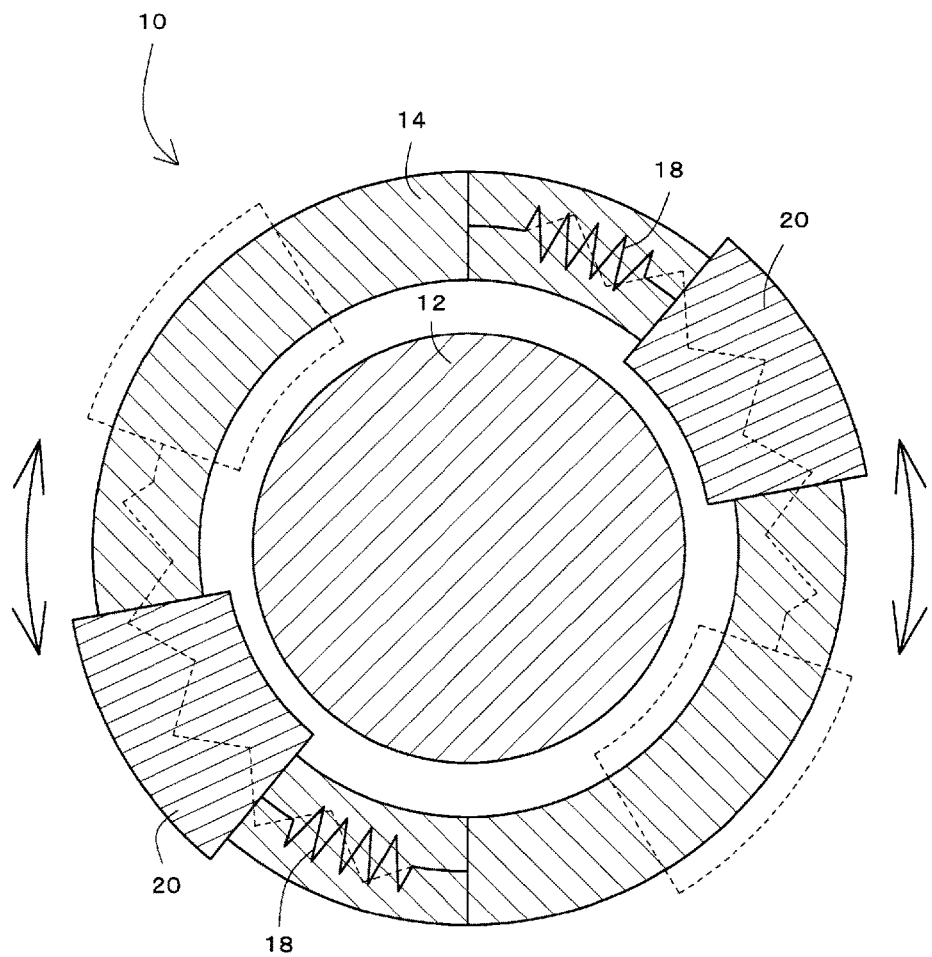

[Fig. 3]
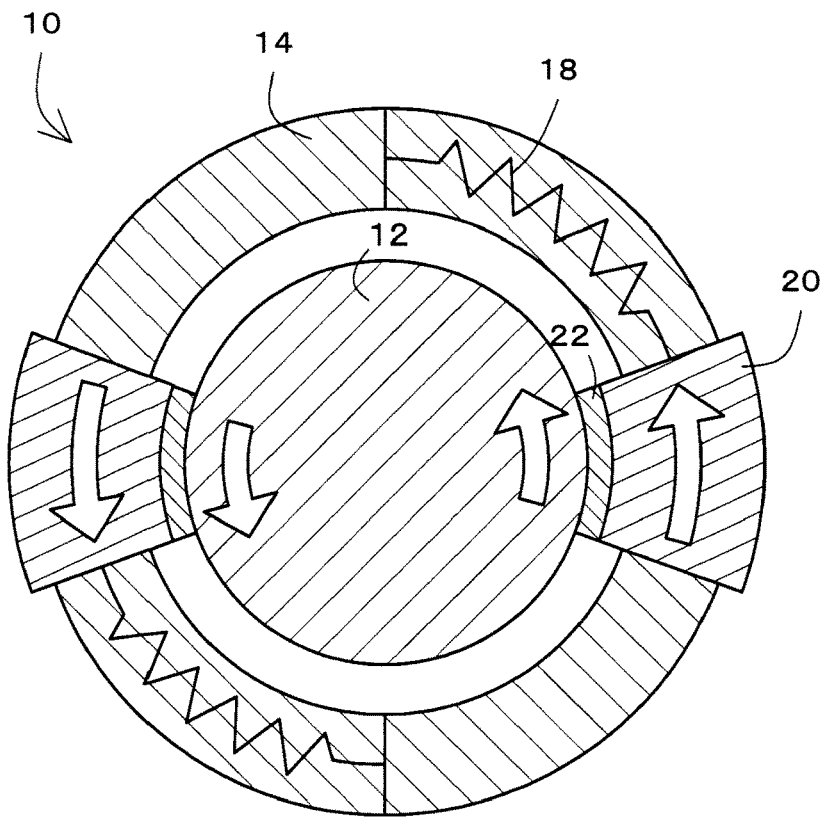
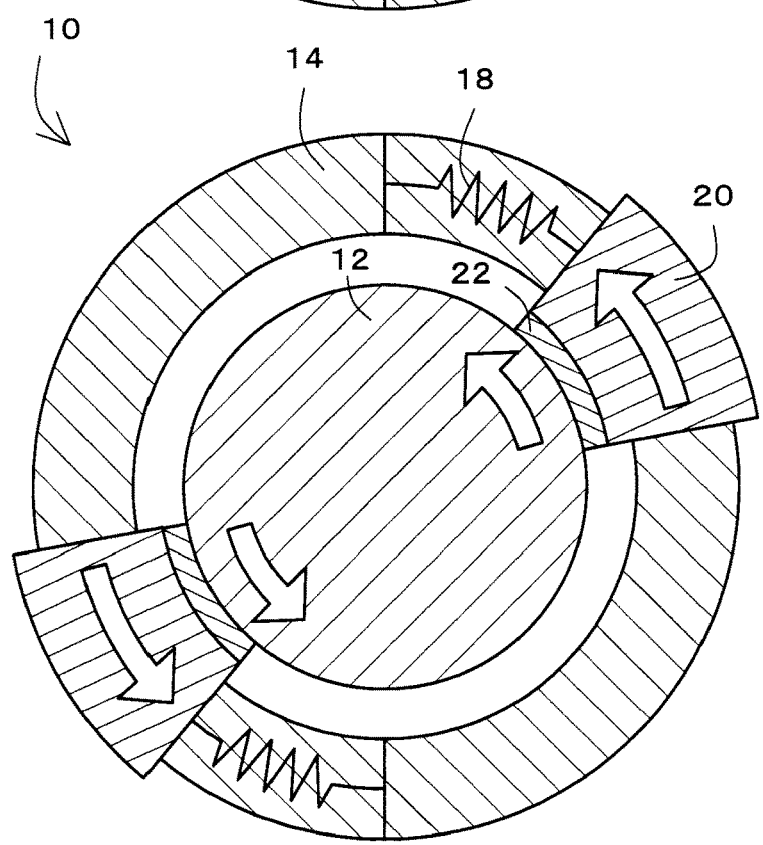

[Fig. 4]
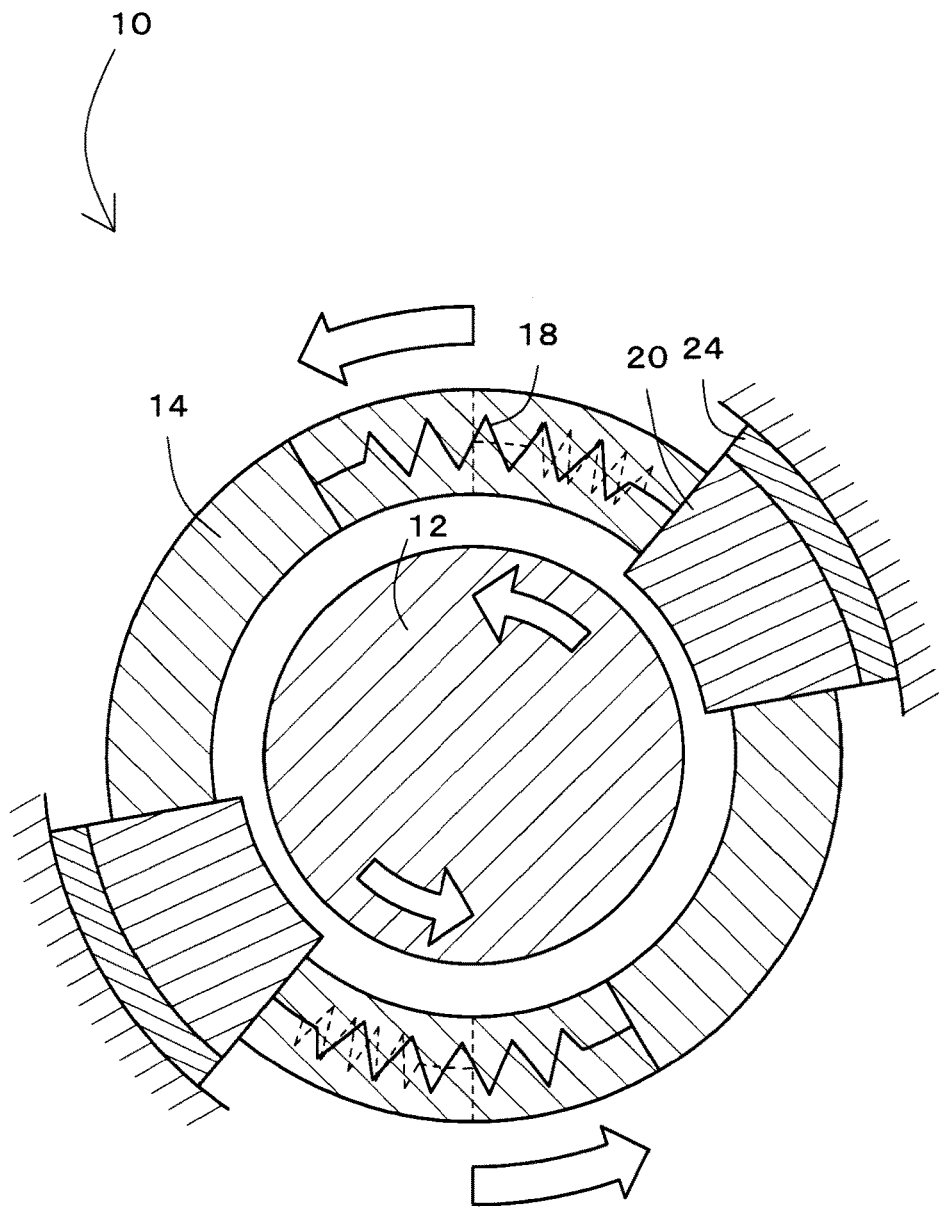

[Fig. 5]
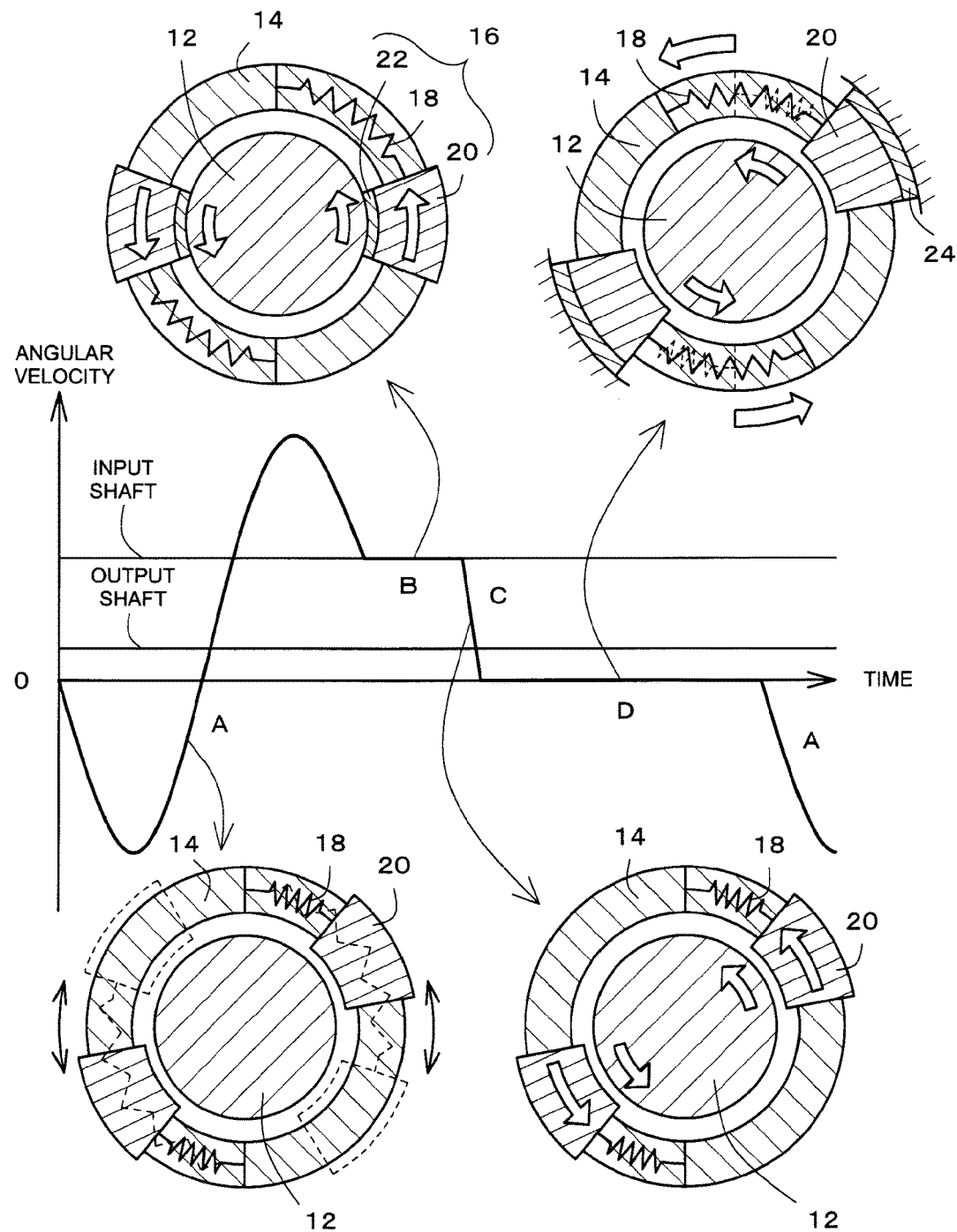

[Fig. 6]
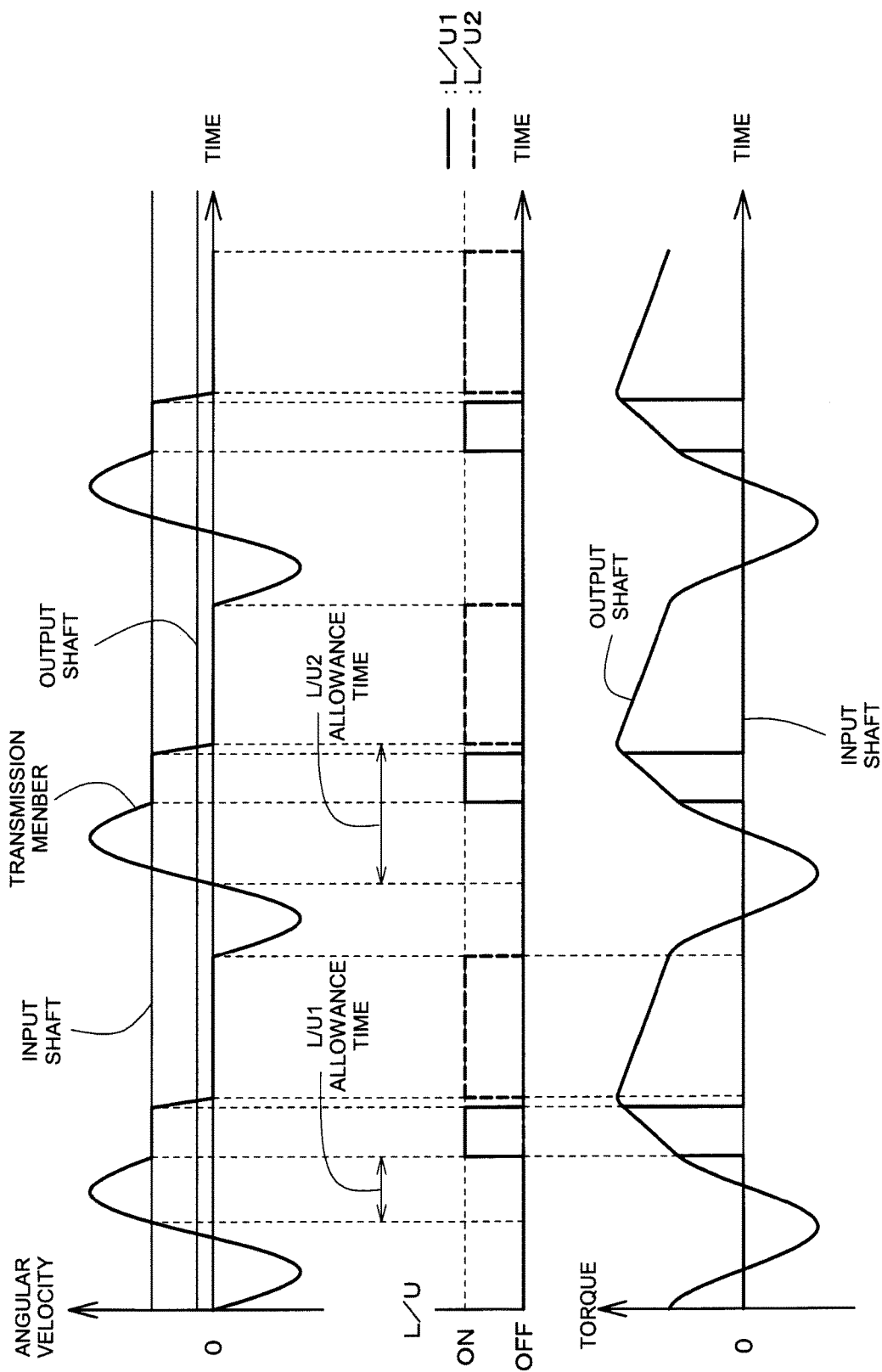

[Fig. 7]
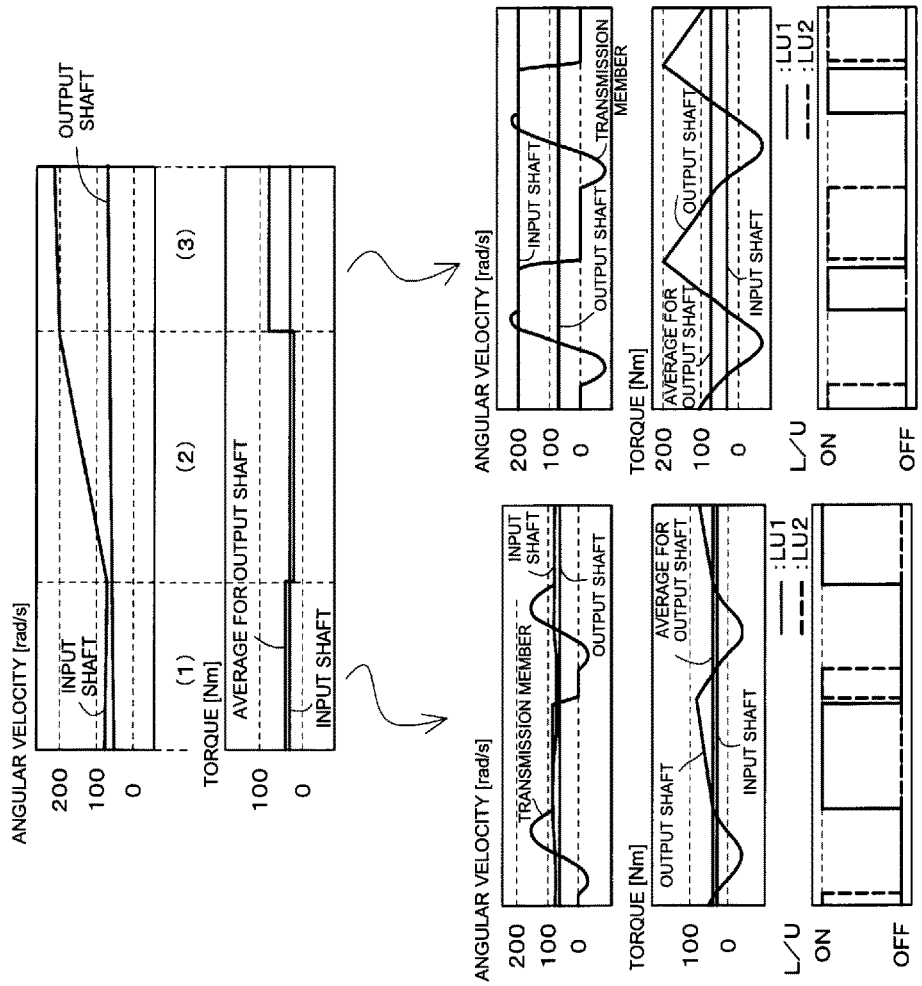

[Fig. 8]
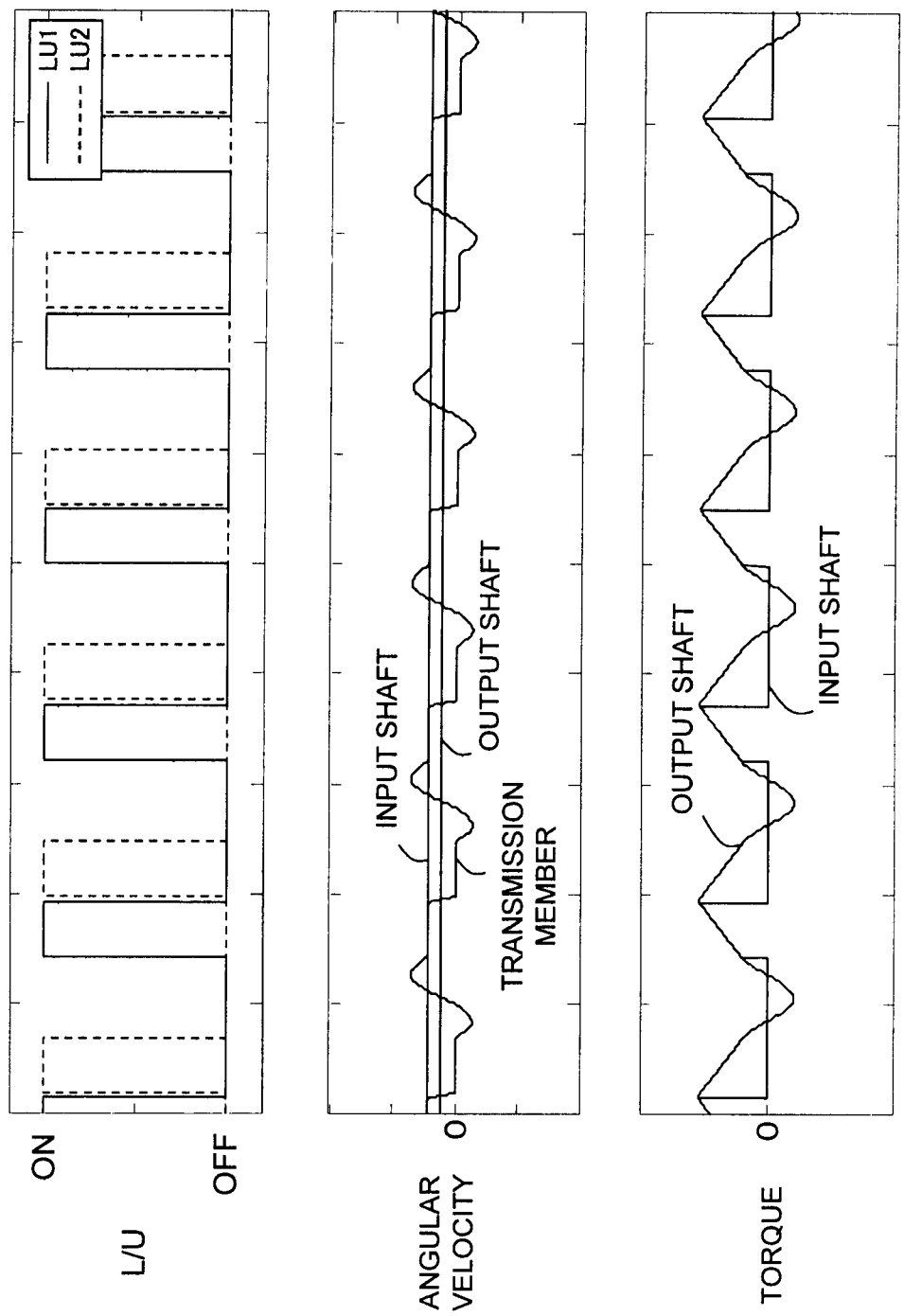

[Fig. 9]
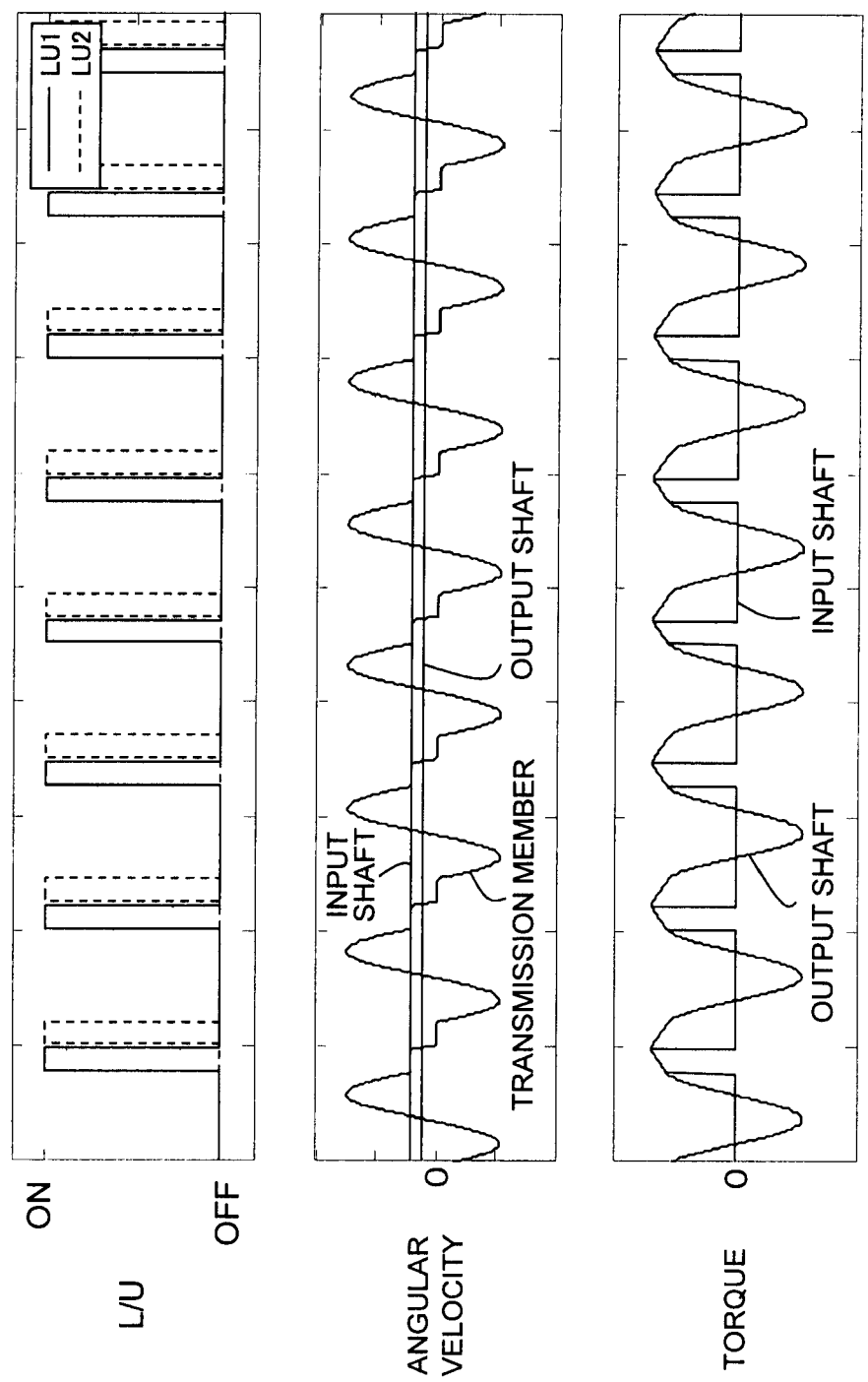

[Fig. 10]
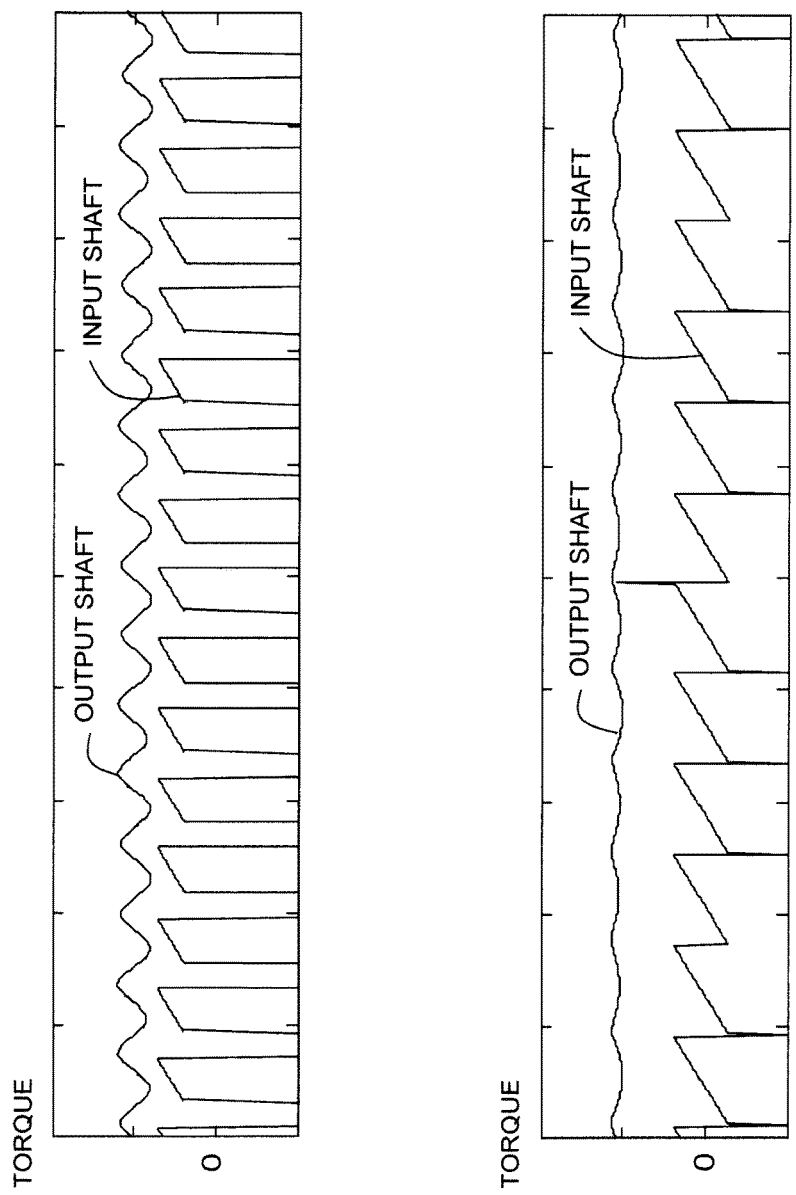
[Fig. 11]
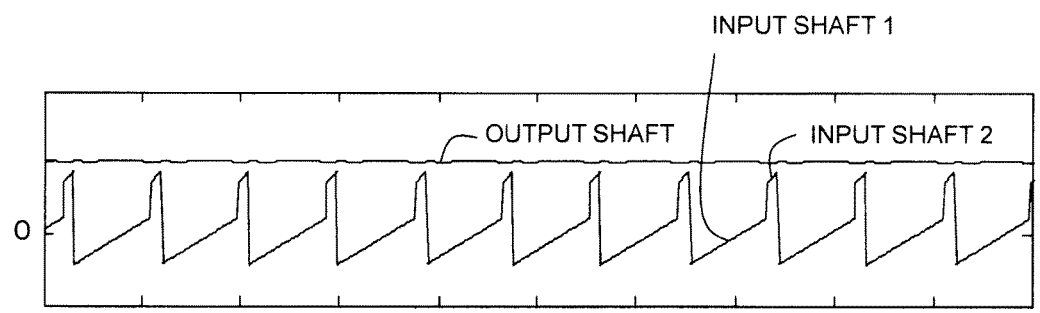

[Fig. 12]
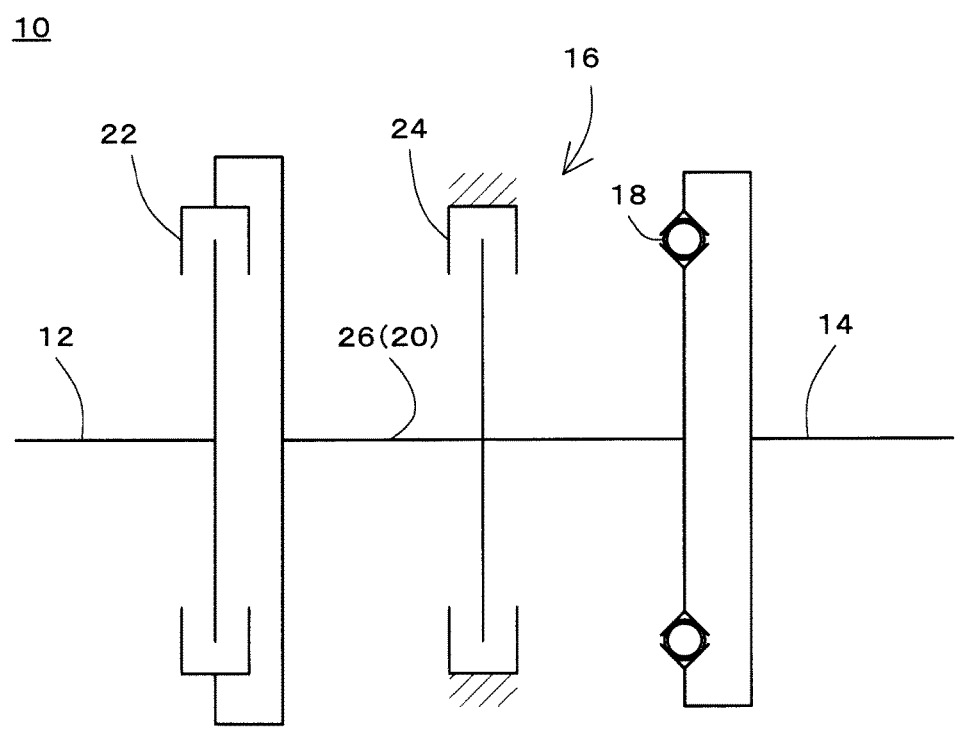

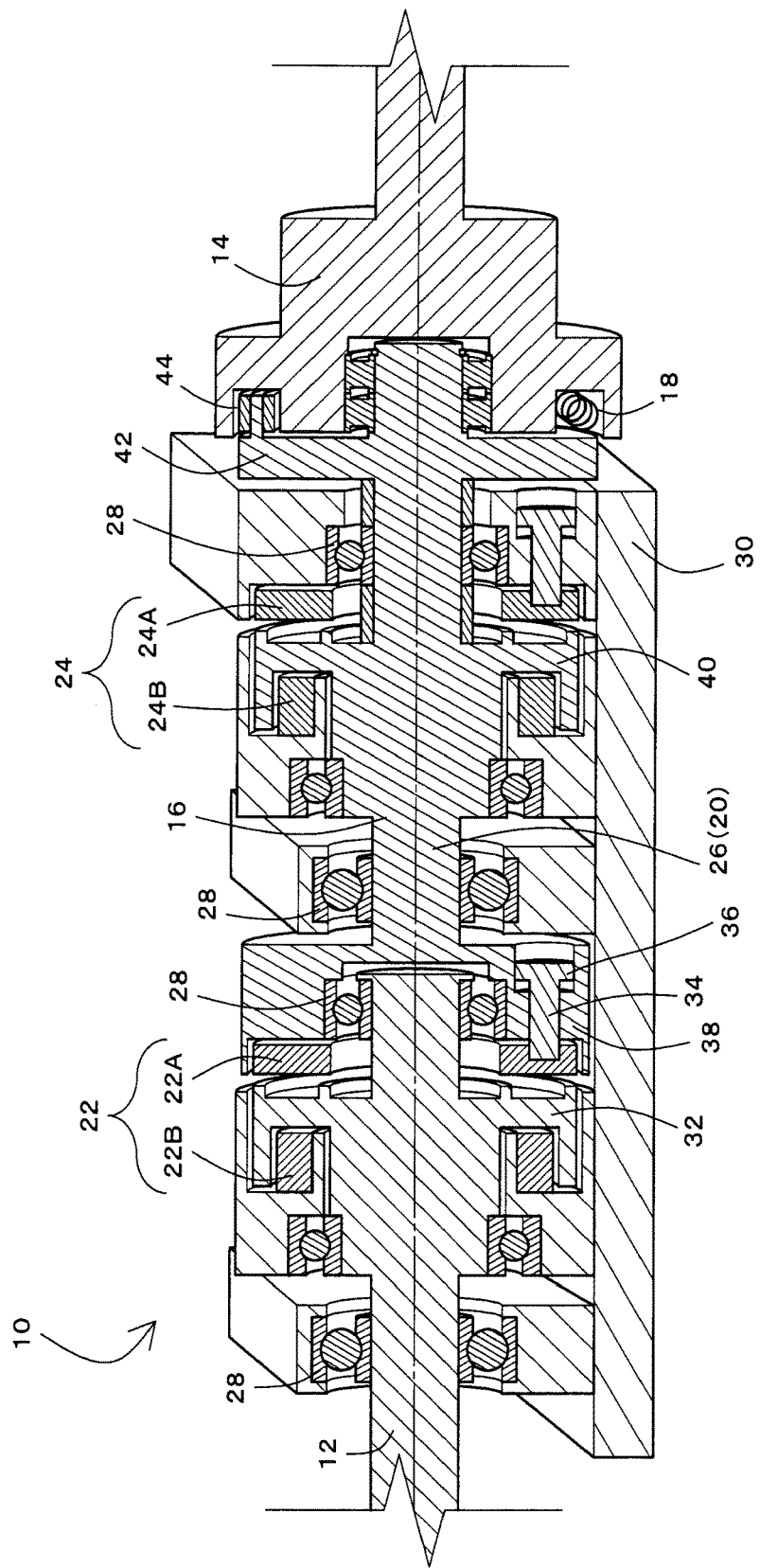
[Fig. 13]

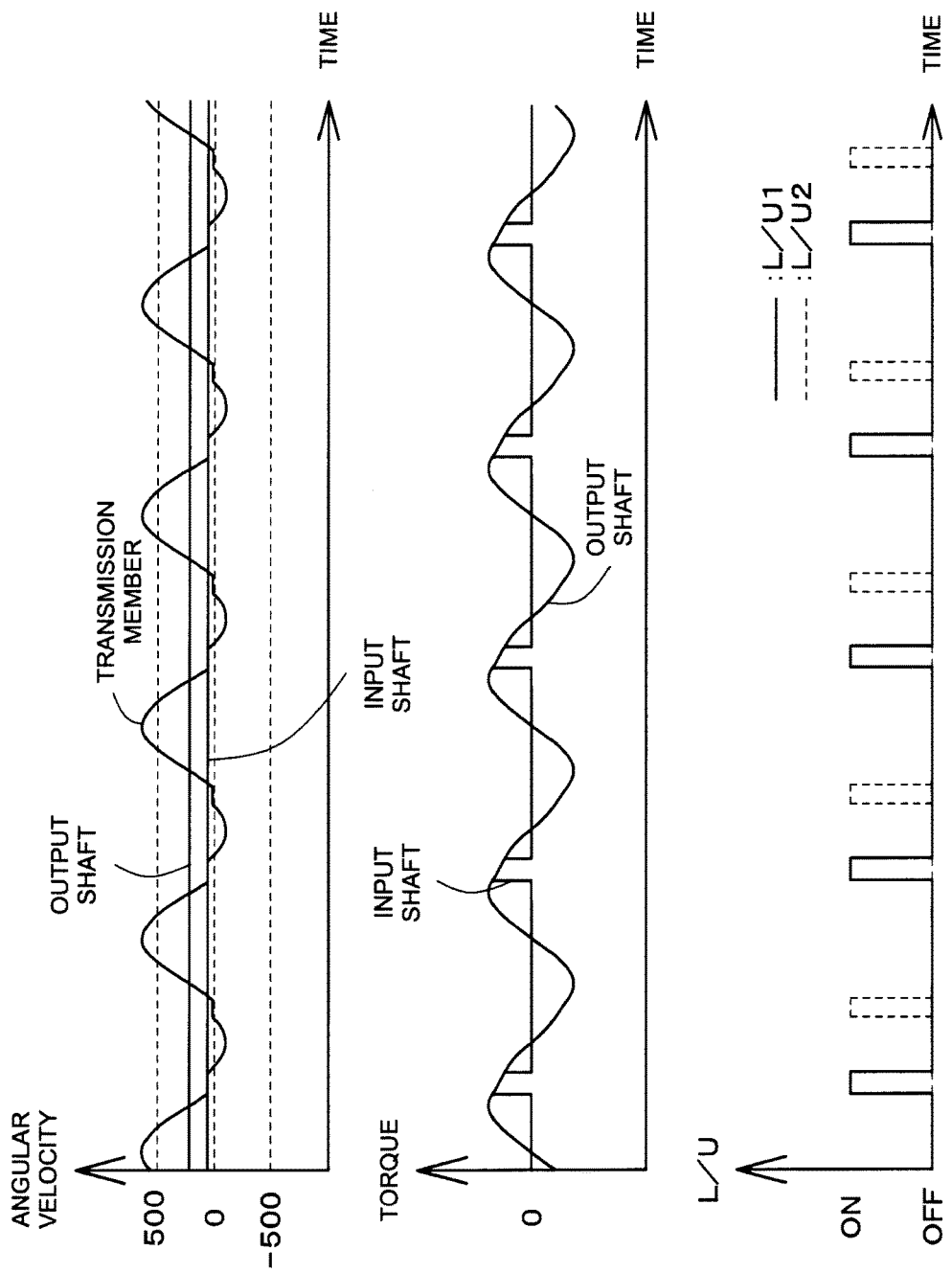
[Fig. 14]

[Fig. 15]
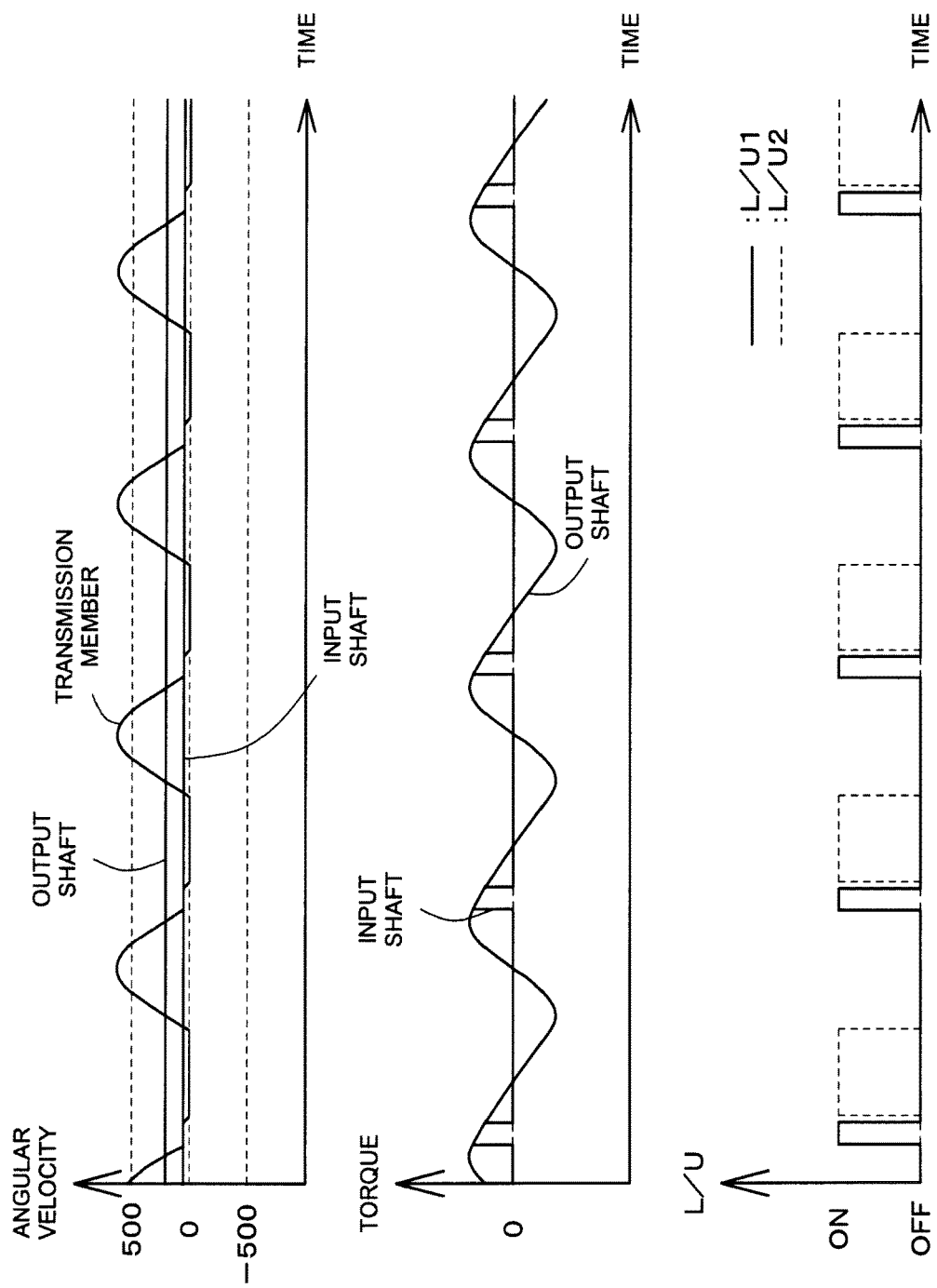

[Fig. 16]
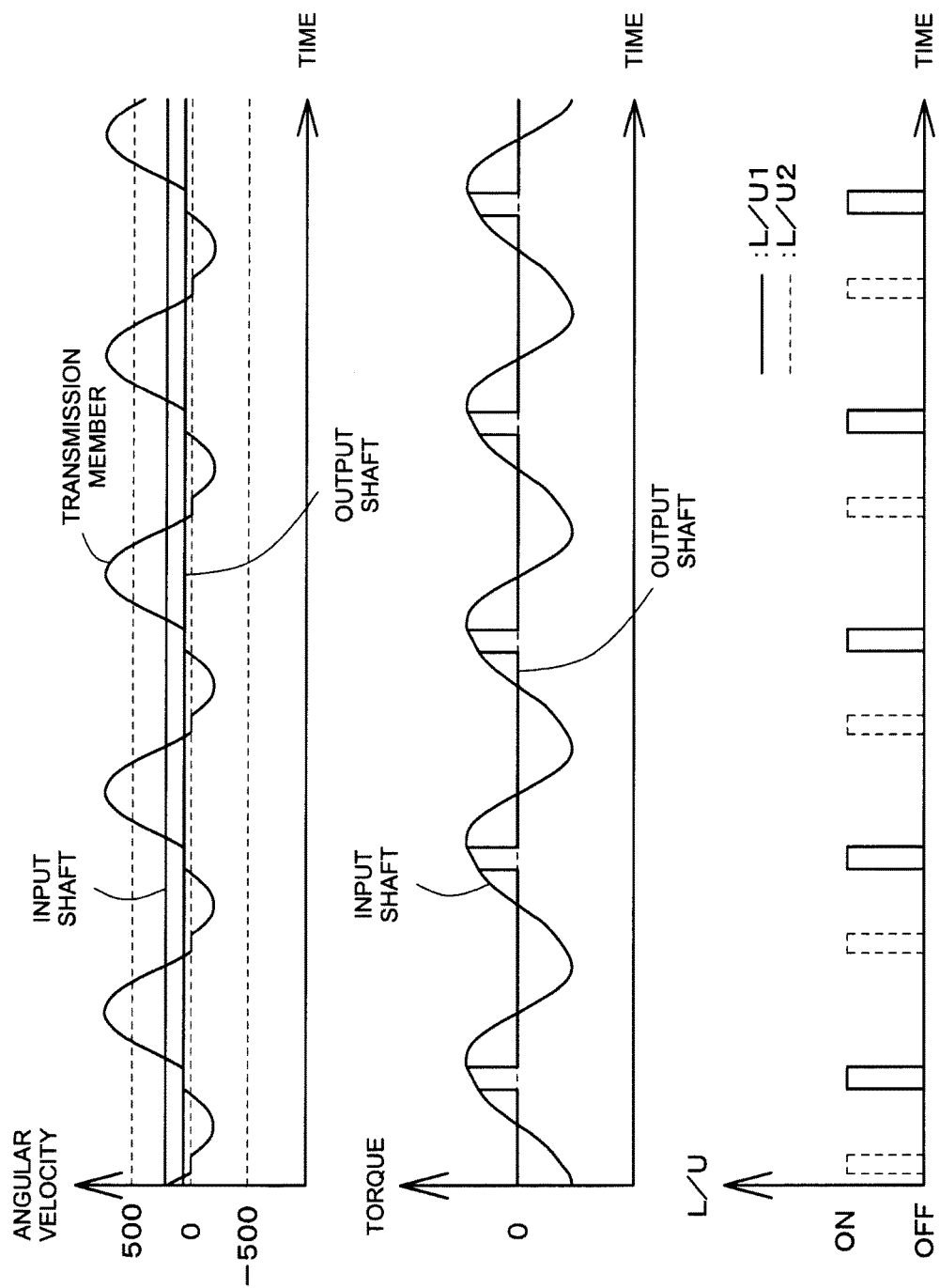

[Fig. 17]
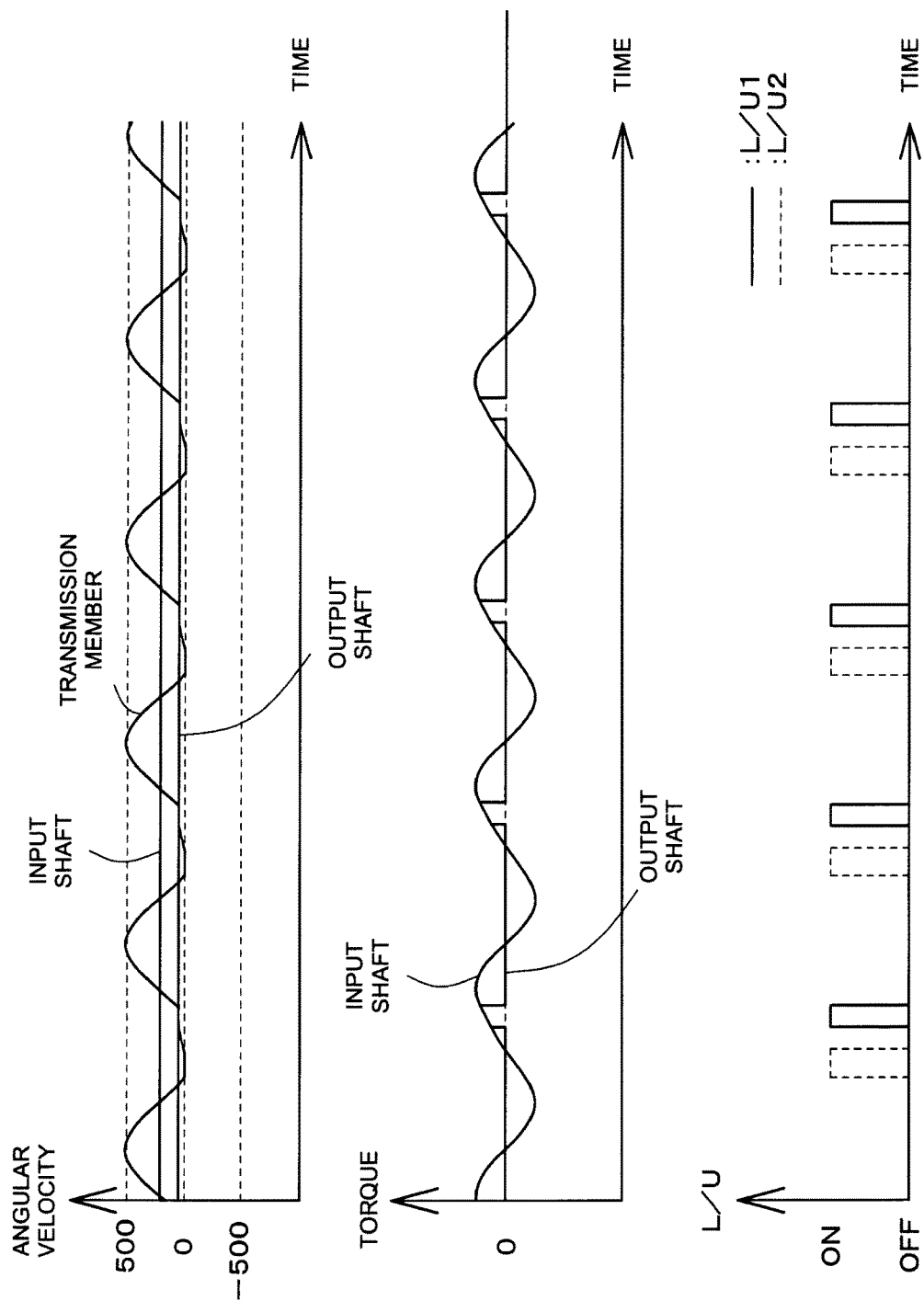

[Fig. 18]
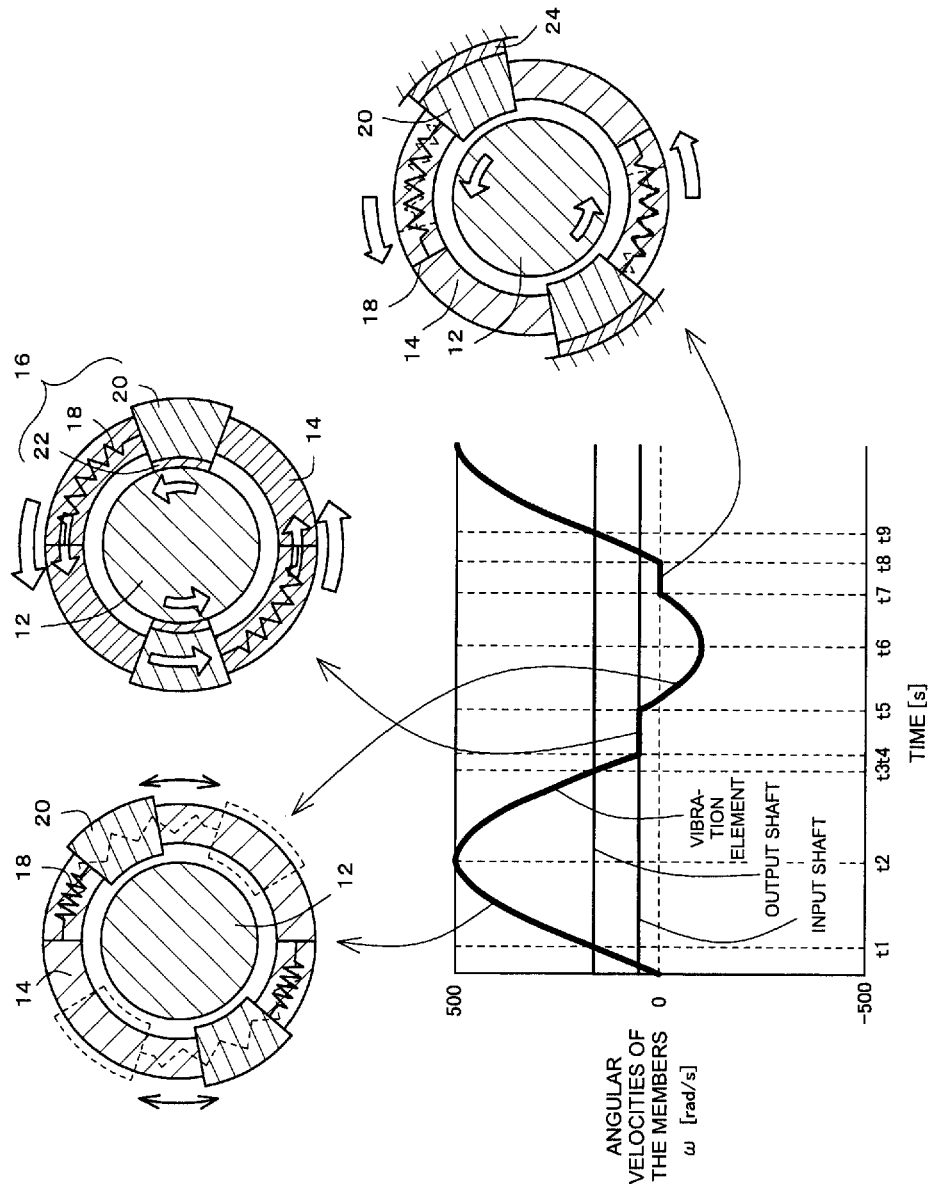

[Fig. 19]
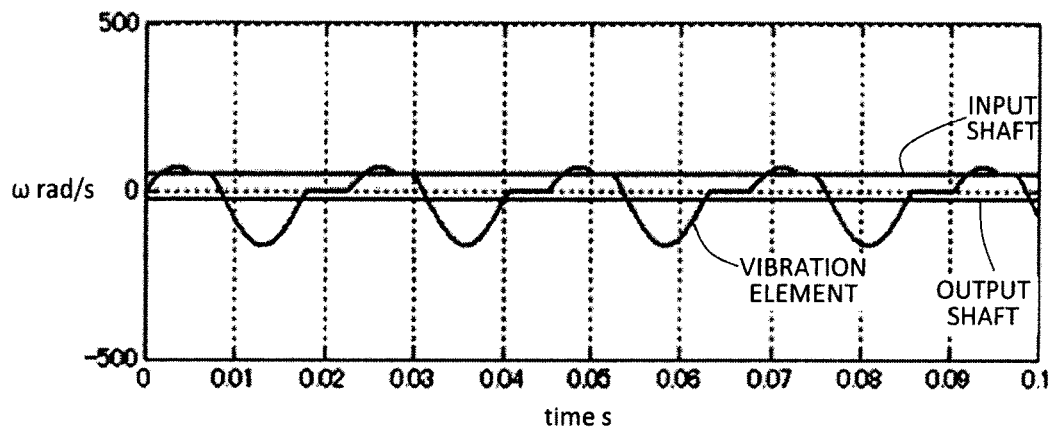
(a) ANGULAR VELOCITIES OF THE COMPONENTS
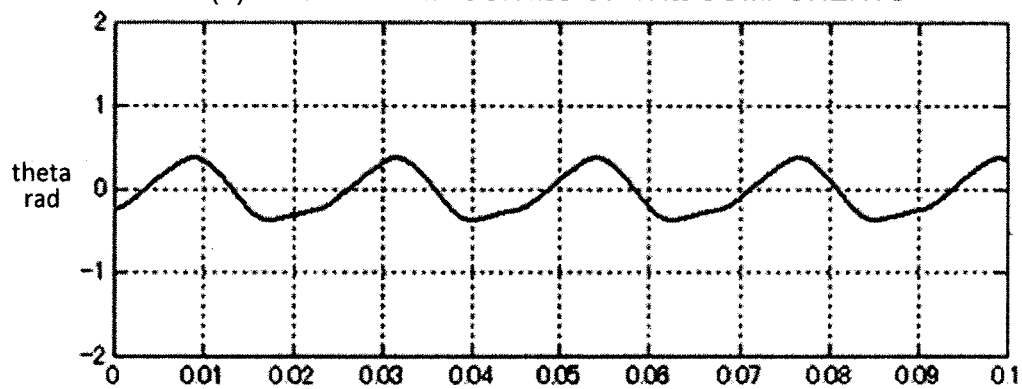
(b) TORQUE / SPRING EXTENSION
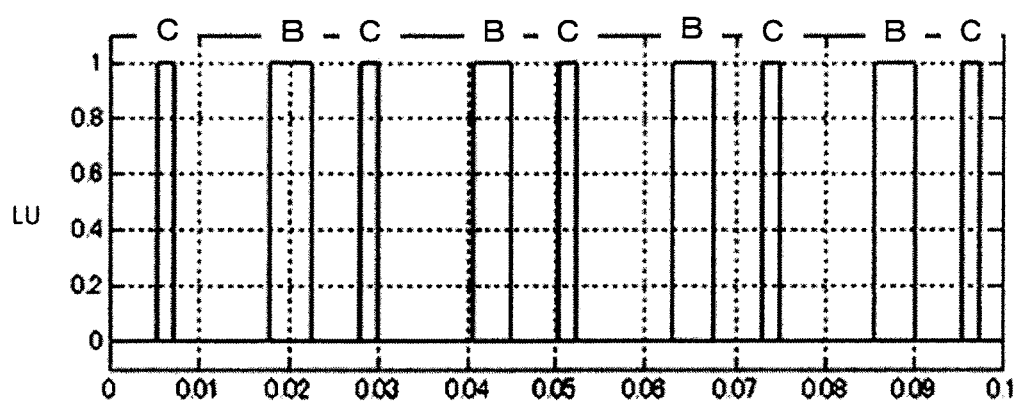
(c) LOCK-UP TIMINGS

[Fig. 20]
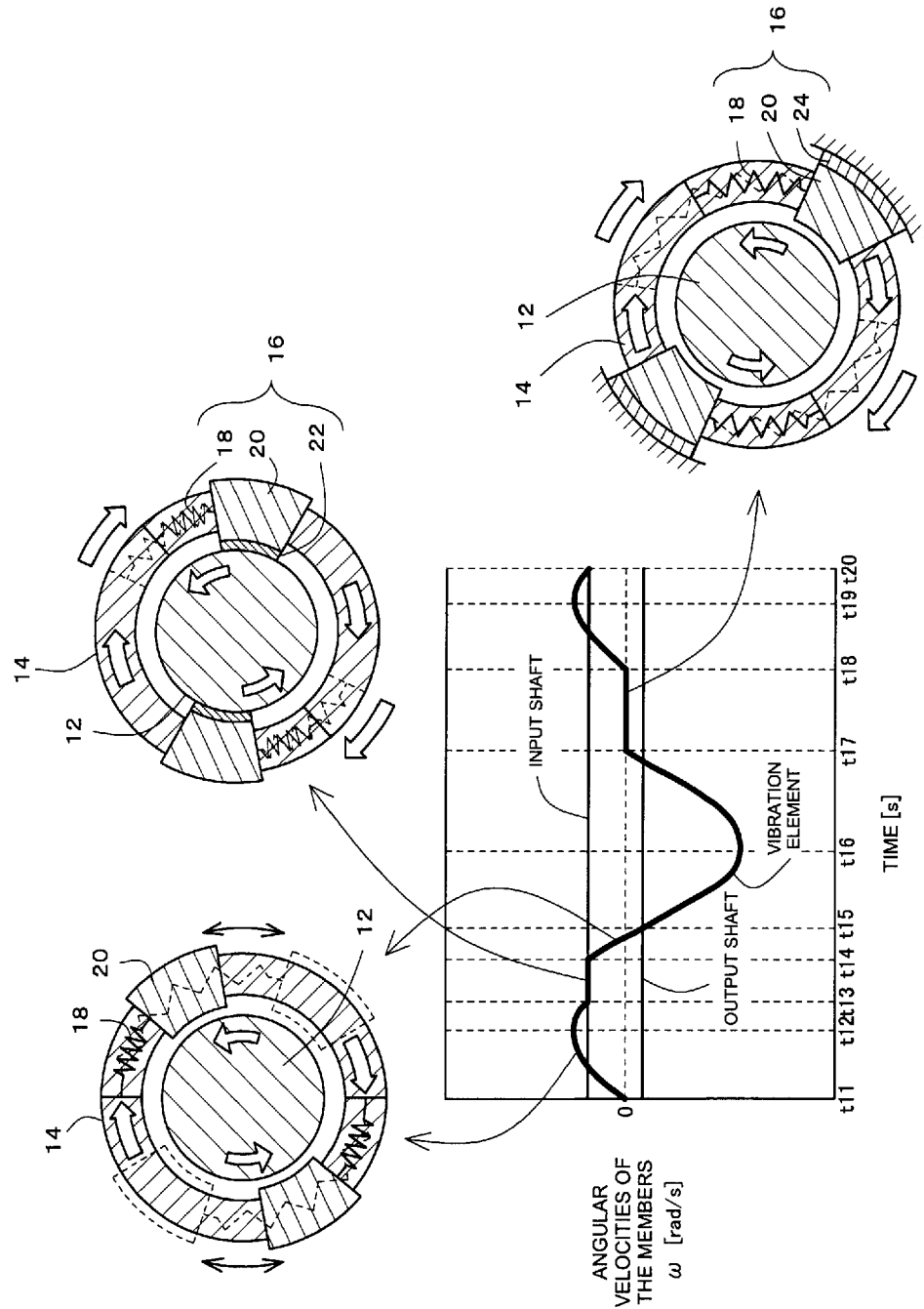

DRIVE POWER TRANSMISSION DEVICE AND CONTROL PROGRAM THEREFOR

TECHNICAL FIELD

The present invention relates to a drive power transmission device that intermittently transmits drive power of an input shaft to an output shaft, and to a control program for the device.

BACKGROUND ART

Conventionally, there have been used drive power transmission devices that transmit drive power of an input shaft to an output shaft while changing angular velocity or torque. For example, JP 2012-251619 A discloses a continuously variable transmission device serving as a drive power transmission device for a vehicle.

In the above-noted continuously variable transmission device, the output shaft is arranged parallel to the input shaft. The input shaft is provided with six eccentric mechanisms that rotate eccentrically in accordance with rotation of the input shaft. The eccentric mechanisms are arranged around the input shaft with the respective centers of the eccentric mechanisms being phase-shifted from each other by 60 degrees. The continuously variable transmission device comprises swing links that swing and rotate in a pushing direction and a returning direction during rotation of the eccentric mechanisms. The continuously variable transmission device further comprises clutches for engaging the swing links and the output shaft with each other.

The continuously variable transmission device intermittently transmits drive power of the input shaft to the output shaft. More specifically, when an eccentric mechanism rotates in accordance with rotation of the input shaft, a corresponding swing link is caused to swing and rotate in the pushing direction. During that time, a corresponding clutch causes the swing link and the output shaft to be engaged with each other, thereby causing the output shaft to rotate. When the swing link swings and rotates in the returning direction, the engagement by the clutch is released. In this way, the respective swing links are sequentially engaged with the output shaft, and, at each instance of the engagement, the output shaft is caused to rotate by 60 degrees.

CITATION LIST

Patent Literature

PTL 1: JP 2012-251619 A

SUMMARY OF INVENTION

Technical Problem

In a conventional drive power transmission device, the timing at which one transmission unit (for example, a group comprising an eccentric mechanism, a swing link, and a clutch) transmits drive power to the output shaft is a fixed timing in synchronization with rotation of the input shaft. For example, during one rotation of the input shaft, the instances at which the transmission unit transmits drive power to the output shaft are limited to one instance. For this reason, it is difficult to make accommodations to achieve flexible drive power transmission, such as changes in transmission timing. An object of the present invention is to provide a drive power transmission device capable of transmitting drive power asynchronously with rotation of the input shaft.

Solution to Problem

A drive power transmission device according to the present invention comprises a first rotation shaft, a second rotation shaft, an elastic member, and a vibration element. One end of the elastic member is fixed to the second rotation shaft, while the other end of the elastic member is fixed to the vibration element, and the vibration element is capable of being placed in either one of a first state of being connected to the first rotation shaft and a second state of being disconnected from the first rotation shaft. By using such a drive power transmission device, drive power of the first rotation shaft can be transmitted to the second rotation shaft asynchronously with rotation of the first rotation shaft. Furthermore, similarly, drive power of the second rotation shaft can be transmitted to the first rotation shaft asynchronously with rotation of the second rotation shaft.

Preferably, the above-described device further comprises a control means capable of performing a first control for placing the vibration element in the first state and a second control for placing the vibration element in the second state. By providing such a control means, drive power of the first rotation shaft can be transmitted to the second rotation shaft at a desired timing. Furthermore, drive power of the second rotation shaft can be transmitted to the first rotation shaft at a desired timing.

In the above-described device, the control means preferably performs the first control when a velocity difference between rotational velocity of the first rotation shaft and movement velocity of the vibration element is smaller than or equal to a predetermined value. By performing control in this way, it is possible to minimize generation of loss due to slipping that may occur when connecting the vibration element to the second rotation shaft.

In the above-described device, preferably, the control means is capable of performing a third control for locking the vibration element and a fourth control for releasing the locking of the vibration element, and is further capable of executing the second control after the first control, executing the third control after the second control, and executing the fourth control after the third control. By performing control in this way, drive power of the first rotation shaft is accumulated as elastic energy in the elastic member, and the accumulated elastic energy of the elastic member is transmitted to the second rotation shaft, so that drive power of the first rotation shaft can be transmitted efficiently to the second rotation shaft. Furthermore, in a similar manner, drive power of the second rotation shaft can be transmitted efficiently to the first rotation shaft.

Preferably, the above-described device further comprises an input means capable of inputting requirement information denoting requirement for the first rotation shaft or the second rotation shaft, and, in response to the requirement information input by the input means, the control means is capable of controlling any one of an amplitude of the vibration element, a period of time from execution of the first control to execution of the second control, and a period of time from execution of the third control to execution of the fourth control. By performing control in this way, drive power of the first rotation shaft can be transmitted to the second rotation shaft at an arbitrary transmission ratio and an arbitrary torque ratio. Furthermore, in a similar manner, drive power of the second rotation shaft can be transmitted to the first rotation shaft at an arbitrary transmission ratio and an arbitrary torque ratio.

In the above-described device, preferably, rotational velocity of the second rotation shaft is higher than rotational velocity of the first rotation shaft, and (i) the first control is executed with respect to the vibration element when the elastic member is capable of urging the second rotation shaft in its rotation direction, and, at that time, the second rotation shaft receives transmission of elastic energy released from the elastic member in addition to drive power of the first rotation shaft, while (ii) the third control is executed with respect to the vibration element when the elastic member is capable of urging the second rotation shaft in an opposite direction from its rotation direction, and, at that time, the second rotation shaft causes elastic energy for urging in said opposite direction to further accumulate in the elastic member. By performing control in this way, the drive power transmission device according to the present invention can be used as an overdrive device.

In the above-described device, the second rotation shaft rotates in a direction counter to rotation of the first rotation shaft. Here, when the elastic member is capable of urging the second rotation shaft in an opposite direction from the rotation direction of the second rotation shaft, the vibration element is placed in the first state, and the mutually counter-rotating first rotation shaft and the second rotation shaft cause further accumulation, in the elastic member, of elastic energy for urging in said opposite direction. Further, when the elastic member is capable of urging the second rotation shaft in the rotation direction of the second rotation shaft, the vibration element is placed in a third state in which the third control is executed, and the second rotation shaft is urged in its rotation direction, whereby elastic energy is released.

A computer program according to the present invention is capable of causing a computer to function as the above-noted control means in the above-described device.

Another drive power transmission device according to the present invention comprises a first rotation shaft, a second rotation shaft, and a transmission member, wherein the transmission member is capable of accumulating and releasing elastic energy by means of its own deformation. The transmission member is fixed relative to the second rotation shaft in its shaft circumferential direction, and is capable of being placed in either one of a fourth state of being connected to the first rotation shaft and a fifth state of being disconnected from the first rotation shaft. According to the above-described configuration, it is possible to achieve a drive power transmission device in which drive power of the first rotation shaft can be transmitted to the second rotation shaft asynchronously with rotation of the first rotation shaft. Furthermore, it is possible to achieve a drive power transmission device in which drive power of the second rotation shaft can be similarly transmitted to the first rotation shaft asynchronously with rotation of the second rotation shaft.

In the above-described device, preferably, the fourth state is also a state for accumulating energy transmitted from the first rotation shaft as elastic energy in the transmission member, and the fifth state is also a state for transmitting the elastic energy of the transmission member to the second rotation shaft. By performing control in this way, drive power of the first rotation shaft is accumulated as elastic energy in the elastic member, and the accumulated elastic energy in the elastic member is transmitted to the second rotation shaft, so that drive power of the first rotation shaft can be transmitted efficiently to the second rotation shaft. Furthermore, in a similar manner, drive power of the second rotation shaft can be transmitted efficiently to the first rotation shaft.

Advantageous Effects of Invention

The present invention enables to transmit drive power asynchronously with rotation of the input shaft.

BRIEF DESCRIPTION OF DRAWINGS

FIG. 1 is a schematic diagram of a drive power transmission device according to an embodiment of the present invention.

FIG. 2 is a schematic diagram explaining operation of the drive power transmission device according to the embodiment.

FIG. 3 is a schematic diagram explaining operation of the drive power transmission device according to the embodiment.

FIG. 4 is a schematic diagram explaining operation of the drive power transmission device according to the embodiment.

FIG. 5 is a schematic diagram explaining operation of the drive power transmission device according to the embodiment.

FIG. 6 is a diagram showing example results of transmission carried out by the drive power transmission device according to the embodiment.

FIG. 7 is a diagram showing example results of transmission carried out by the drive power transmission device according to the embodiment.

FIG. 8 is a diagram showing example results of transmission carried out by the drive power transmission device according to the embodiment.

FIG. 9 is a diagram showing example results of transmission carried out by the drive power transmission device according to the embodiment.

FIG. 10 is a diagram showing example results of transmission carried out by the drive power transmission device according to the embodiment.

FIG. 11 is a diagram showing example results of transmission carried out by a drive power transmission device according to an embodiment of the present invention.

FIG. 12 is a schematic diagram explaining a configuration of a drive power transmission device according to an embodiment of the present invention.

FIG. 13 is a side cross-sectional view showing the drive power transmission device according to the embodiment.

FIG. 14 is a diagram showing example results of transmission carried out by the drive power transmission device according to the embodiment.

FIG. 15 is a diagram showing example results of transmission carried out by the drive power transmission device according to the embodiment.

FIG. 16 is a diagram showing example results of transmission carried out by the drive power transmission device according to the embodiment.

FIG. 17 is a diagram showing example results of transmission carried out by the drive power transmission device according to the embodiment.

FIG. 18 is a diagram for explaining the embodiment of FIG. 14 in detail.

FIG. 19 is a diagram showing further example results of transmission carried out by the drive power transmission device according to the embodiment.

FIG. 20 is a diagram for explaining the details of FIG. 19.

DESCRIPTION OF EMBODIMENTS

FIG. 1 shows a schematic diagram of a drive power transmission device 10 according to an embodiment of the present invention. The drive power transmission device 10 includes an input shaft 12, an output shaft 14, a transmission member 16, a control unit 19, and velocity sensors 21A, 21B. For example, the drive power transmission device 10 may be employed as a transmission means in a vehicle for transmitting drive power from a drive source such as an internal combustion engine to drive wheels.

The input shaft 12 is driven to be rotated by a drive source (not shown). The output shaft 14 is arranged to be spaced from the input shaft 12 while being coaxial with the input shaft 12. For example, the output shaft 14 may have a hollow shape as shown in FIG. 1 with the input shaft 12 being arranged on the inside, or alternatively, as shown in FIG. 13 explained later, the output shaft 14 may be arranged coaxially and in a longitudinally adjacent relationship with the input shaft 12.

The transmission member 16 transmits drive power of the input shaft 12 to the output shaft 14 via an elastic member 18. As described in the following, the transmission member 16 transmits drive power of the input shaft 12 to the output shaft 14 in synchronization with a vibration element 20 that is reciprocated along the shaft circumferential direction of the input shaft 12. Although two transmission members 16 are provided on the output shaft 14 in FIG. 1, the present invention is not limited to this configuration. For example, there may be provided only one transmission member 16. Further, for achieving balance in the radial direction (i.e., as counterweights), a plurality of transmission members 16 may be provided in axial symmetry. The transmission member 16 includes the elastic member 18, the vibration element 20, a clutch 22, and a brake 24.

The elastic member 18 is fixed at a fixed point on the output shaft 14, and extends along the shaft circumference at a position spaced from the central axis of the output shaft 14. For example, on an axial end face of the output shaft 14, a slot is formed along the circumferential direction, and the elastic member 18 is arranged inside this slot. With the slot serving as a guide, the elastic member 18 is caused to expand and contract (i.e., effect elastic vibration) along the shaft circumference of the output shaft 14. The elastic member 18 may be composed of a coil spring, for example. One end of the elastic member 18 in the lengthwise direction is fixed to the output shaft 14, while the other end is fixed to the vibration element 20.

It is preferable that the period of vibration of the elastic member 18 is shorter than the maximum period of rotation of the drive source. For example, when the drive source is an internal combustion engine having a maximum rotational speed (or maximum allowable rotational speed) of 6000 rpm (=100 Hz), it is preferable to provide an elastic member 18 having a natural frequency higher than 100 Hz. By configuring as such, it becomes possible to transmit drive power to the output shaft 14 over a plurality of instances during one rotation of the input shaft 12, as described in the following.

The vibration element 20 is coupled to the elastic member 18, and is caused to reciprocate in the shaft circumferential direction of the output shaft 14 in accordance with expansion and contraction of the elastic member 18. The vibration element 20 may be composed of a rigid material such as a metal, for example. The vibration element 20 may be configured as a weight that reciprocates along the slot together with the elastic member 18, or alternatively, as shown in FIG. 13 explained later, the vibration element 20 may be a transmission shaft that is arranged coaxially with the output shaft 14 and rotates about the axis in accordance with expansion and contraction of the elastic member 18.

The clutch 22 is an engagement means for engaging the vibration element 20 with the input shaft 12. The clutch 22 is configured as an element that can perform operations for achieving engagement and release between the vibration element 20 and the input shaft 12 at a high speed. For example, the clutch 22 is preferably an element that can perform the engaging and releasing operations in a cycle shorter than that for the frequency of vibration of the elastic member 18. Considering this point, the clutch 22 is configured, for example, as an electromagnetic clutch that performs the engaging and releasing operations by means of electric power connection and disconnection with respect to an electromagnet.

Further, the clutch 22 may be a one-way clutch. A one-way clutch actuates mechanically in response to relative velocity between the input shaft 12 and the vibration element 20. By using a one-way clutch, even if an engagement control signal is output from the control unit 19 as explained in the following while in a region in which the relative velocity between the input shaft 12 and the vibration element 20 is relatively high, it is possible to wait until the velocity difference between the input shaft 12 and the vibration element 20 is reduced and then reliably engage the two components with each other. In other words, control can be performed with an allowance time (see FIG. 6) to provide control delay.

The brake 24 serves to lock the vibration element 20 to a fixed member (non-rotating member) such as a housing. Similarly to the clutch 22, the brake 24 is also configured as an element that can perform operations for achieving locking and release of the vibration element 20 at a high speed. For example, the brake 24 is configured as an electromagnetic brake that performs the locking and releasing operations by means of electric power connection and disconnection with respect to an electromagnet.

The velocity sensor 21A measures the rotational velocity (angular velocity) of the input shaft 12, and transmits the measured rotational velocity to the control unit 19. The velocity sensor 21B measures the movement velocity of the vibration element 20, and transmits the measured movement velocity to the control unit 19. And further, the control unit 19 may receive the movement velocity of the output shaft 14 from another velocity sensor.

The control unit 19 controls operation of the clutch 22 and the brake 24 in accordance with the rotational velocity of the input shaft 12 and the movement velocity of the vibration element 20. The control unit 19 may be a computer. The computer may have stored therein an operation control program for the clutch 22 and the brake 24, as described in the following. Alternatively, the computer may be a built-in computer. The control unit 19 includes an input interface which receives input of the rotational velocity of the input shaft 12 from the velocity sensor 21A and also receives input of the movement velocity of the vibration element 20 from the velocity sensor 21B.

By outputting predetermined control signals, the control unit 19 controls the clutch 22 and the brake 24. That is, the control unit 19 controls the clutch 22 to thereby effect engagement and release between the vibration element 20 and the input shaft 12. Further, the control unit 19 controls the brake 24 to thereby effect locking and release of the vibration element 20.

Next, transmission of drive power carried out by the transmission member 16 is described below with reference to FIGS. 2 to 4. In the following, it is assumed that the rotational velocity of the input shaft 12 is higher than the rotational velocity of the output shaft 14. As shown in FIG. 2, the elastic member 18 is biased in advance along the shaft circumference, and, by means of its own elasticity, is caused to expand and contract in the shaft circumferential direction of the output shaft 14. In accordance with this movement, the vibration element 20 is also caused to reciprocate in the shaft circumferential direction of the output shaft 14.

In order to place the elastic member 18 in a vibrating state during transmission of drive power, it is preferable to configure such that the elastic member 18 is in a biased state at a stage before transmission (i.e., at a stand-by stage). For example, as shown by a dashed line in FIG. 4 explained later, the vibration element 20 and the output shaft 14 are locked while the elastic member 18 is in a contracted state.

As shown in FIG. 3, the clutch 22 causes the input shaft 12 and the vibration element 20 to be engaged with each other in synchronization with the period of reciprocation of the vibration element 20. In other words, drive power of the input shaft 12 is transmitted to the output shaft 14 in synchronization with the period of vibration of the elastic member 18.

By carrying out transmission of drive power in synchronization with the period of vibration of the elastic member 18, drive power transmission can be performed independently from the period of rotation of the input shaft 12. Further, by using an elastic member 18 having a period of vibration that is shorter than the maximum period of rotation of the drive source, transmission of drive power can be carried out over a plurality of instances during one rotation of the input shaft 12. Additionally, while the drive power transmission is carried out intermittently, by performing the intermittent transmission at a high speed (i.e., at a high frequency), smooth drive power transmission similar to that achieved by PWM control can be attained.

In one example of effecting engagement between the input shaft 12 and the vibration element 20 in synchronization with the period of reciprocation of the vibration element 20, the two components are caused to be engaged with each other when the velocity difference between the movement velocity of the vibration element 20 and the rotational velocity of the input shaft 12 is smaller than or equal to a predetermined value. For example, the two components are caused to be engaged with each other when the velocity of one of the components is within a range from 80% to 120% of the velocity of the other component. By effecting engagement between the input shaft 12 and the vibration element 20 while the velocity difference is small as described above, it is possible to minimize generation of loss due to slipping that may occur at the time of effecting engagement.

More preferably, engagement between the vibration element 20 and the input shaft 12 is effected when the two components have the same angular velocity. The angular velocity of the vibration element 20 varies in accordance with the elastic energy of the elastic member 18. Within one period of vibration of the vibration element 20, at points other than angular velocity extrema, the angular velocities of the input shaft 12 and the vibration element 20 become equal to each other at two instances. At either one of the two instances, the clutch 22 causes the input shaft 12 and the vibration element 20 to be engaged with each other. By effecting engagement when the angular velocities are equal, it is possible to minimize generation of loss due to slipping.

When the input shaft 12 and the vibration element 20 are engaged with each other by the clutch 22, the elastic member 18 is caused to contract in accordance with the velocity difference between the input shaft 12 and the output shaft 14 (where (input shaft angular velocity)>(output shaft angular velocity)), so that elastic energy of the elastic member 18 is accumulated, as illustrated in the upper and lower diagrams in FIG. 3. In other words, drive energy of the input shaft 12 is converted into elastic energy of the elastic member 18.

Subsequently, as shown in FIG. 4, the clutch 22 is released, and the vibration element 20 is locked by the brake 24. At that point, the elastic member 18 transmits the accumulated elastic energy to the output shaft 14. That is to say, the elastic member 18 transmits the drive energy of the input shaft 12 as power to the output shaft 14. Specifically, when the vibration element 20 is locked, the contracted elastic member 18 rotates (pushes) the output shaft 14 in order to expand to its natural length. In this way, drive power is transmitted from the input shaft 12 to the output shaft 14.

The drive power transmission from the input shaft 12 to the output shaft 14 via the elastic member 18 can be expressed numerically as follows. For example, in a case in which the ratio of the angular velocity of the input shaft 12 relative to the angular velocity of the output shaft 14 is 5:3, $2/5$ of the input energy, which corresponds to the differential during engagement of the clutch 22, is maintained in the elastic member 18 as elastic energy, and the remaining $3/5$ of the energy is transmitted to the output shaft 14.

The control unit 19 executes control for enabling the above-described drive power transmission. The control unit 19 receives the rotational velocity of the input shaft 12 and the movement velocity of the vibration element 20 from the velocity sensors 21A, 21B. Alternatively, instead of the measured velocities, it is also possible to use calculated values obtained by performing calculations based on values such as the natural frequencies of the input shaft 12, the output shaft 14, and the elastic member 18.

When the relative velocity between the input shaft 12 and the vibration element 20 becomes less than or equal to a predetermined velocity, the control unit 19 performs a control to engage the vibration element 20 and the input shaft 12 with each other by controlling the clutch 22 (elastic energy accumulation control). By this control, the elastic member 18 is caused to contract in accordance with the velocity difference between the input shaft 12 and the output shaft 14, so that elastic energy is accumulated in the elastic member 18.

When elastic energy is accumulated in the elastic member 18, the control unit 19 performs a control to release the clutch 22 and subsequently lock the vibration element 20 using the brake 24 (elastic energy transmission control). The locking of the vibration element 20 using the brake 24 may be executed when the velocity of the vibration element relative to the drive power transmission device 10 becomes less than or equal to a predetermined value. By this control, the elastic member 18 is caused to expand, so that the accumulated elastic energy is transmitted to the output shaft 14. As a result, drive power is transmitted from the input shaft 12 to the output shaft 14.

FIG. 5 shows example changes in the velocities of the input shaft 12, the vibration element 20, and the output shaft 14 that occur during the above-described drive power transmission. In the region denoted by A in FIG. 5, the vibration element 20 is released from the clutch 22 and the brake 24, and is reciprocating along the shaft circumferential direction of the output shaft 14. In this state, the maximum angular velocity of the vibration element 20 is higher than the angular velocity of the input shaft 12.

As shown in the region denoted by B in FIG. 5, when the angular velocity of the vibration element 20 and the angular velocity of the input shaft 12 become equal to each other, the clutch 22 causes the input shaft 12 and the vibration element 20 to be engaged with each other. During the engagement, the vibration element 20 and the input shaft 12 have the same velocity.

After elastic energy is accumulated in the elastic member 18 (i.e., after the elastic member 18 is contracted), the engagement by the clutch 22 is released (as shown at C in FIG. 5). Subsequently, the vibration element 20 is locked by the brake 24, so that the angular velocity of the vibration element 20 becomes zero (as shown at D in FIG. 5). After the elastic energy of the elastic member 18 is transmitted to the output shaft 14, the brake 24 is released, and the vibration element 20 reciprocates again (as shown at A in FIG. 5).

FIG. 6 shows example changes in angular velocity and torque of the input shaft 12, the output shaft 14, and the vibration element 20. In FIG. 6, the "L/U" diagram in the middle row shows engagement (or "lock-up") of the clutch 22 and engagement of the brake 24. LU1 denotes engagement of the clutch 22, while LU2 denotes engagement of the brake 24.

The diagram in the bottom row of FIG. 6 illustrates changes in the torque received by the input shaft 12 from the transmission member 16 (i.e., input torque, as viewed from the drive power transmission device 10), and changes in the torque received by the output shaft 14 from the transmission member 16 (i.e., torque transmitted from the transmission member 16 to the output shaft 14). Hereinafter, the former torque is referred to as the input shaft torque, while the latter torque is referred to as the output shaft torque.

When the input shaft 12 and the vibration element 20 are engaged with each other by the clutch 22 (i.e., LU1 is ON), the input shaft torque is generated. Further, when the engagement of the clutch 22 is released (i.e., LU1 is OFF) and the vibration element 20 is locked by the brake 24 (i.e., LU2 is ON), elastic energy of the elastic member 18 is transmitted to the output shaft 14.

By performing a combined analysis of the top row diagram and the bottom row diagram in FIG. 6, it can be understood that the output-side angular velocity is lower than the input-side angular velocity, while the output shaft torque is greater than the input shaft torque. According to a detailed examination of these results by the present inventors, the ratio of the output-side angular velocity relative to the input-side angular velocity (i.e., the transmission ratio) is approximately 1/4, and the ratio of the output shaft torque relative to the input shaft torque (i.e., the torque ratio) is approximately 4 times.

FIG. 7 shows an example of transmission performed at transmission ratios and torque ratios that are different from those in FIG. 6. In the lower part of FIG. 7, the graphs illustrating torque changes show the values of the output shaft torque together with its average value. In the initial state (segment (1)), between the input shaft 12 and the output shaft 14, the transmission ratio is 1/1.3, while the torque ratio is 1.3. From this state, the angular velocity of the input shaft 12 is increased (segment (2)). At that time, angular velocity variation (amplitude) of the vibration element 20 is increased so that the maximum angular velocity of the vibration element 20 becomes higher than the final angular velocity (200 rad/s in segment (3)) of the input shaft. More specifically, a longer clutch 22 engagement period (i.e., longer LU1) is used to pull the vibration element 20. Alternatively or additionally, a shorter brake 24 engagement period (i.e., shorter LU2) is used to assign more elastic energy to vibration of the elastic member 18. In this way, the amplitude of the elastic member 18 is increased.

Further, when the angular velocity of the vibration element 20 becomes equal to a desired angular velocity, the clutch 22 is engaged to accumulate elastic energy of the elastic member 18. Subsequently, the clutch 22 is released and the brake 24 is engaged so as to transmit the elastic energy to the output shaft 14 (segment (3)). In segment (3), the transmission ratio is 1/2.5, while the torque ratio is 2.5.

As described above, in the present embodiment, by changing the amplitude of the vibration element 20, the clutch 22 engagement period, and the brake 24 engagement period, the transmission ratio and the torque ratio between the input shaft 12 and the output shaft 14 can be made to vary. In principle, such variation can be effected continuously, in a non-stepwise manner. In other words, continuously variable transmission can be achieved using the simple structure as shown in FIG. 1.

It is noted that the amplitude of the vibration element 20, the clutch 22 engagement period, and the brake 24 engagement period for obtaining desired transmission ratio and torque ratio are not limited to a single set of values. For example, FIGS. 8 and 9 illustrate examples in which the same transmission ratio and torque ratio are obtained by changing conditions of the above-noted three parameters.

In FIG. 8, the amplitude of the vibration element 20 is smaller than in FIG. 9, but the clutch 22 engagement period (LU1) and the brake 24 engagement period (LU2) are set longer than in FIG. 9. Even when conditions of the amplitude of the vibration element 20, the clutch 22 engagement period, and the brake 24 engagement period are changed in various ways as such, the same transmission ratio and torque ratio can be obtained.

Comparing the torque changes in FIGS. 8 and 9, it can be seen that changes in the output shaft torque are larger in the example of FIG. 9 in which the clutch 22 engagement period is shorter. This point is explained with reference to FIG. 10. FIG. 10 shows output shaft torque changes that are generated when the clutch 22 engagement period is changed. According to FIG. 10, the range of variation in the output shaft torque becomes reduced as the clutch 22 engagement period is made longer.

Accordingly, from the aspect of minimizing output shaft torque changes, the clutch 22 engagement period is preferably long. On the other hand, in cases such as when the elastic member 18 to be used has a low spring modulus and its amplitude of vibration becomes increased with respect to predetermined elastic energy, the clutch 22 engagement period must inevitably be made shorter, as shown in FIG. 9. In such cases, it is preferable to connect a plurality of drive power transmission devices 10 and set the respective clutch 22 engagement periods at complementary times. FIG. 11 illustrates torque changes generated when two drive power transmission devices 10 are provided coaxially and in a side-by-side relationship with the input shaft 12. The input shaft torque becomes multi-phased, and as a result, the output shaft torque is smoothed out.

The control unit 19 executes continuously variable transmission control as described above. The control unit 19 comprises an input interface (or signal line) for inputting a required transmission ratio and a required torque ratio (i.e., requirement information) which are required of the input shaft 12 by the output shaft 14. Further, in the control unit 19, a memory unit (not shown) has stored therein a table in which transmission ratio and torque ratio are correlated with amplitude of the vibration element 20, clutch 22 engagement period, and brake 24 engagement period. This table can be obtained by actually measuring or calculating the correlations indicating what transmission ratio and torque ratio between the input shaft 12 and the output shaft 14 are obtained when amplitude of the vibration element 20, clutch 22 engagement period, and brake 24 engagement period are changed in various ways. Instead of the table, an algorithm or function corresponding to the table may be stored.

The control unit 19 refers to the table based on the required transmission ratio and the required torque ratio input via the input interface, and thereby acquires an amplitude of the vibration element 20, a clutch 22 engagement period, and a brake 24 engagement period. Subsequently, based on the acquired amplitude of the vibration element 20, clutch 22 engagement period, and brake 24 engagement period, the control unit 19 controls the clutch 22 and the brake 24.

A specific configuration of a drive power transmission device 10 according to another embodiment of the present invention is described next. FIG. 12 shows a schematic diagram depicted by extracting main elements from among specific structural elements of the drive power transmission device 10. In this figure, a transmission member 16 and an output shaft 14 are located along the axial direction of an input shaft 12.

The transmission member 16 comprises a clutch 22, a brake 24, an elastic member 18, and a transmission shaft 26. The clutch 22 is provided at an axial end of the transmission shaft 26 so as to be engageable with a flange located at an axial end of the input shaft 12. At an axially central portion of the transmission shaft 26, the brake 24 is provided. Further, at an end of the transmission shaft 26 opposite from the end at which the clutch 22 is disposed, the elastic member 18 is provided. The elastic member 18 is coupled to the transmission shaft 26, and the transmission shaft 26 is reciprocated in the shaft circumferential direction in accordance with vibration of the elastic member 18. As such, the transmission shaft 26 corresponds to the vibration element 20 in FIG. 1 and other figures.

FIG. 13 shows an example of a specific structure according to the configuration of FIG. 12. The input shaft 12, the transmission shaft 26, and the output shaft 14 are arranged coaxially. The input shaft 12 and the transmission shaft 26 are rotatably supported on a base 30 via bearings 28.

A flange 32 is formed radially extending from the input shaft 12. The clutch 22, which is disposed on respective sides of this flange 32, includes a movable part 22A and a magnetizing part 22B.

The magnetizing part 22B receives a magnetizing current from a power source (now shown) and thereby generates magnetic flux. The magnetizing part 22B is an annular member that is fixed to the base 30 while being spaced from the input shaft 12 and the transmission shaft 26.

The movable part 22A is an annular member composed of a magnetic material such as a metal, and is movable in response to magnetic flux generated from the magnetizing part 22B. The movable part 22A is coupled to the transmission shaft 26 via a fastening member 34 screwed into the movable part 22A in the axial direction. A shaft part 36 of the fastening member 34 is formed to have a length greater than the axial thickness of an input-side flange 38 of the transmission shaft 26. With this structure, the movable part 22A is fixed in the shaft circumferential direction relative to the transmission shaft 26, while being movable in the axial direction. When magnetic flux is generated in the magnetizing part 22B, the movable part 22A is attracted in the axial direction and engages with the flange 32 of the input shaft 12.

The transmission shaft 26 comprises the input-side flange 38, a mid flange 40, and an output-side flange 42. These flanges are formed on the transmission shaft 26 sequentially along the axial direction from the input shaft 12 toward the output shaft 14. When the movable part 22A of the clutch 22 provided on the input-side flange 38 engages with the input shaft 12, the transmission shaft 26 rotates synchronously with the input shaft 12.

The elastic member 18 is coupled to the output-side flange 42. The elastic member 18 is arranged in a slot 44 extending along the shaft circumference of the output shaft 14. One end of the elastic member 18 in the extending direction of the slot 44 is coupled to the output-side flange 42, while the other end is coupled to the output shaft 14. When the transmission shaft 26 is engaged with the input shaft 12, the transmission shaft 26 urges the elastic member 18 to contract.

The brake 24 is provided at the mid flange 40. Similarly to the clutch 22, the brake includes a movable part 24A and a magnetizing part 24B, which are disposed on respective sides of the mid flange 40. The movable part 24A is movable relative to the base 30 in the axial direction only. When magnetic flux is generated in the magnetizing part 24B, the movable part 24A is attracted in the axial direction and engages with the transmission shaft 26. As a result, rotation of the transmission shaft 26 is stopped.

Drive power transmission from the input shaft 12 to the output shaft 14 is carried out as described in the following. First, by causing the input shaft 12 and the transmission shaft 26 to be engaged with each other via the clutch 22, these two components rotate synchronously. Due to this synchronous rotation, the elastic member 18 coupled to the transmission shaft 26 is contracted. Subsequently, by releasing the clutch 22 and locking the transmission shaft 26 using the brake 24, the elastic member 18 transmits elastic energy to the output shaft 14. As a result, drive power is transmitted from the input shaft 12 to the output shaft 14.

While the above embodiment was described while referring to an example drive power transmission performed when the rotational velocity of the input shaft 12 is higher than the rotational velocity of the output shaft 14, the present invention is not limited to this form of drive power transmission. For example, the drive power transmission device 10 of the present embodiment can also perform drive power transmission when the rotational velocity of the input shaft 12 is lower than the rotational velocity of the output shaft 14. FIGS. 14 and 15 show timing charts regarding drive power transmission performed when the rotational velocity of the input shaft 12 is lower than the rotational velocity of the output shaft 14. In FIG. 14, engagement and release of the clutch 22 are effected during acceleration of the vibration element 20 (i.e., when (spring extension)<(natural length)), and locking and release by the brake 24 are effected during deceleration of the vibration element 20 (i.e., when (spring extension)>(natural length)). In FIG. 15, engagement and release of the clutch 22 are effected during acceleration of the vibration element 20, locking by the brake 24 is effected also during acceleration of the vibration element 20, and release of the brake 24 is effected also during acceleration of the vibration element 20.

Details of the operation of the drive power transmission device 10 as illustrated in FIG. 14 are now described with reference to FIG. 18. Here, as the velocity of the input shaft 12 is lower than the velocity of the output shaft 14, the drive power transmission device 10 functions as an overdrive device.

At time t1, the relative velocity between the vibration element 20 and the output shaft 14 becomes zero. That is, the elastic member 18 expands fully, and the vibration velocity of the vibration element 20 becomes zero. Subsequently, the vibration element 20 is caused to move in the contracting direction of the elastic member 18; i.e., in the rotation direction of the output shaft 14. At time t2, the elastic member 18 assumes its natural length (i.e., the length of the elastic member 18 when the amplitude velocity component of the vibration element 20 has the maximum value). After the elastic member 18 contracts fully at time t3, the vibration element 20 is caused to move in the expanding direction of the elastic member 18; i.e., in the direction opposite to the rotation direction of the output shaft 14.

In the embodiment of FIG. 18, as the rotational velocity of the output shaft 14 is higher than the rotational velocity of the input shaft 12, when the vibration element 20 is rotating in the direction opposite to the rotation direction of the output shaft 14, and more specifically at time t4, the absolute velocity of the vibration element 20 (i.e., the combined velocity of the vibration of the elastic member 18 and the rotation of the output shaft 14) becomes equal to the rotational velocity of the input shaft 12. At that point, by means of the clutch 22, the vibration element 20 and the input shaft 12 are caused to be engaged with each other. As the relative velocity between these two components is zero, no slipping occurs in principle.

When the vibration element 20 and the input shaft 12 are engaged with each other, torque of the input shaft 12 is transmitted to the output shaft 14 via the transmission member 16. Here, since the rotational velocity of the output shaft 14 is higher than the rotational velocity of the input shaft 12, elastic energy is partially released from the elastic member 18, which is in the contracted state with a length shorter than its natural length (i.e., in a state capable of urging the output shaft 14 in its rotation direction), and is transmitted to the output shaft 14 (time t4 to t5). In other words, during the period from time t4 to t5, torque of the input shaft 14 and torque of the elastic member 18 are transmitted to the output shaft 14.

When the engagement by the clutch is released at time t5, the elastic member 18, which is still in the course of expansion, rotates in the direction opposite to the rotation of the output shaft 14. The elastic member 18 expands to a length longer than its natural length (t6), and subsequently when the absolute velocity of the vibration element 20 (i.e., the combined velocity of the vibration of the elastic member 18 and the rotation of the output shaft 14) becomes zero (t7), the vibration element 20 is anchored via the brake 24 to a fixed member (non-rotating member) such as the housing. As the relative velocity between the two components (the vibration element 20 and the housing) is zero, no slipping occurs in principle.

At that time, the elastic member 18, which is in the expanded state with a length longer than its natural length (i.e., in a state capable of urging the output shaft 14 in the direction opposite to its rotation direction), is further expanded by being urged by the output shaft 14 (time t7 to t8). In other words, elastic energy for urging in the direction opposite to the rotation direction of the output shaft 14 is transmitted from the output shaft 14 to the elastic member 18. After the transmission of elastic energy, the process continues with operation corresponding to that at time t1 (which is equivalent to t9).

As described above, according to the present embodiment, the input shaft 12 and the elastic member 18 transmit torque to the output shaft 14 during the period from time t4 to t5, and at least a part of the torque transmitted from the elastic member 18 is returned from the output shaft 14 to the elastic member 18 during the period from time t7 to t8. That is to say, in the present embodiment, torque transmission from the input shaft 12 to the output shaft 14 is carried out via energy cancellation between transmitted elastic energy of the elastic member 18 and transmitted torque of the output shaft 14.

It is noted that the timings of engagement of the clutch 22 and the brake 24 in the embodiment of FIG. 18 need not be limited to the point at which there is an exact match between the absolute velocity of the vibration element 20 and the rotational velocity of the input shaft 12, and the point at which the absolute velocity of the vibration element 20 becomes exactly zero. The timings are sufficient so long as the magnitude of loss due to slipping can be considered ignorable relative to the input and output energy. For example, engagement between the two engaged components may be effected when the velocity of one of the components is within a range from 80% to 120% of the velocity of the other component.

FIGS. 19 and 20 illustrate further example results of motive power transmission carried out by a drive power transmission device 10 according to an embodiment of the present invention. The example shown relates to a case of motive power transmission performed when the input shaft 12 and the output shaft 14 are rotating in directions counter to each other.

FIG. 19 shows timing charts for the drive power transmission device 10. The graph in the top row illustrates transitions in the angular velocities of the input shaft 12, the vibration element 20, and the output shaft 14. The vertical axis indicates angular velocity, while the horizontal axis indicates time. As shown in this graph, the input shaft 12 and the output shaft 14 have angular velocities that appear on the respective sides of the zero velocity line, and it can be understood that the two shafts are mutually counter-rotating.

The graph in the middle row of FIG. 19 illustrates torque of the output shaft 14 and expansion of the elastic member 18. The vertical axis indicates vibration displacement of the elastic member 18. By multiplying the vibration displacement by a spring constant, output torque of the output shaft 14 is obtained. The horizontal axis indicates time in synchronization with the top row graph.

The graph in the bottom row of FIG. 19 illustrates the timings of engagement (lock-up timings) of the clutch 22 (C) and the brake 24 (B) of the transmission member 16. The vertical axis indicates engagement ratio, with 0 representing release and 1 (=100%) representing full engagement. The horizontal axis indicates time in synchronization with the top and middle row graphs.

FIG. 20 shows an enlarged view of a portion extracted from the top row graph in FIG. 19, the portion corresponding to one cycle of motive power transmission by the transmission member 16. The starting point is time t11, at which the absolute velocity of the vibration element 20 (i.e., the combined velocity of the vibration of the elastic member 18 and the rotation of the output shaft 14) becomes zero. The elastic member 18 contracts, so that the vibration element 20 moves in the same direction as the input shaft 12 (first rotation shaft). At time t12, the elastic member 18 assumes its natural length (i.e., the length of the elastic member 18 when the amplitude velocity component of the vibration element 20 has the maximum value). The elastic member 18 contracts further so that the vibration element 20 decelerates, and, at time t13, the absolute velocity of the vibration element 20 becomes equal to the rotational velocity of the input shaft 12. At that point, by means of the clutch 22, the vibration element 20 and the input shaft 12 are caused to be engaged with each other (first state). As the relative velocity between these two components is zero, no slipping occurs in principle.

Since the input shaft 12 and the output shaft 14 (second rotation shaft) are mutually counter-rotating, when the vibration element 20 and the input shaft 12 are engaged with each other, the elastic member 18, which is in a contracted state with a length shorter than its natural length (i.e., in a state capable of urging the second rotation shaft 14 in the opposite direction from the rotation direction of the second rotation shaft 14), is contracted further by the torque of the two shafts 12, 14. In other words, elastic energy is accumulated in the elastic member 18 by means of the urging by the input shaft 12 and the output shaft 12 (time t13 to t14).

When the engagement by the clutch is released at time t14 (second state), the elastic member 18 contracts further, and, at time t15, the velocity of the vibration element 20 becomes equal to the velocity of the output shaft 14. That is, the elastic member 18 contracts fully, and the rotation velocity of the vibration element 20 becomes zero. Subsequently, due to expanding motion of the elastic member 18, the vibration element 20 is caused to move in the direction opposite to the rotation of the input shaft 12 (i.e., in the same direction as the output shaft 14). At time t16, the elastic member 18 assumes its natural length, and the vibration element 20 is further caused to move in the expanding direction of the elastic member 18, which corresponds to the rotation direction of the output shaft 14.

When the absolute velocity of the vibration element 20 becomes zero at time t17, the vibration element 20 is anchored via the brake 24 to a fixed member (non-rotating member) such as the housing (third state). As the relative velocity between the two components (the vibration element 20 and the housing) is zero, no slipping occurs in principle.

At that point, the elastic member 18, which has expanded to a length beyond its natural length (i.e., which is in a state capable of urging the second rotation shaft 14 in the rotation direction of the second rotation shaft 14), contracts so as to pull the output shaft 14 (time t17 to t18). As the pulling direction is the same as the rotation direction of the output shaft 14, the elastic energy of the elastic member 18 serves as torque in the same direction as the rotation direction of the output shaft 14, and thereby urges the output shaft 14. In other words, the elastic energy of the elastic member 18 is released to the output shaft 14. After the release of the elastic energy, the engagement of the brake 24 is released, and the process continues with operation corresponding to that at time t11 (which is equivalent to t18).

As described above, according to the present embodiment, by biasing the elastic member 18 with the input shaft 12 and the output shaft 14 during the period from time t13 to t14, elastic energy is accumulated in the elastic member 18. Further, at least a part of the torque transmitted from the output shaft 14 is returned from the elastic member 18 to the output shaft 14 during the period from time t17 to t18. That is to say, in the present embodiment, torque transmission from the input shaft 12 to the output shaft 14 is carried out via energy cancellation between transmitted elastic energy of the elastic member 18 and transmitted torque of the output shaft 14.

The timings of engagement of the clutch 22 and the brake 24 in the embodiment of FIGS. 19 and 20 need not be limited to the point at which there is an exact match between the absolute velocity of the vibration element 20 and the rotational velocity of the input shaft 12, and the point at which the absolute velocity of the vibration element 20 becomes exactly zero. The timings are sufficient so long as the magnitude of loss due to slipping can be considered ignorable relative to the input and output energy. For example, engagement between the two engaged components may be effected when the velocity of one of the components is within a range from 80% to 120% of the velocity of the other component.

Although the elastic member 18 and the vibration element 20 are provided on the output shaft 14 in the above-described embodiment, the present invention is not limited to this configuration. FIGS. 16 and 17 show timing charts regarding drive power transmission performed with a configuration in which the elastic member 18 and the vibration element 20 are provided on the input shaft 12 instead of the output shaft 14. FIGS. 16 and 17 illustrate examples in which the rotational velocity of the input shaft 12 is higher than the rotational velocity of the output shaft 14. In FIG. 16, engagement and release of the clutch 22 are effected during acceleration of the vibration element 20, and locking and release by the brake 24 are effected during deceleration of the vibration element 20. In FIG. 17, engagement and release of the clutch 22 are effected during acceleration of the vibration element 20, locking by the brake 24 is effected during deceleration of the vibration element 20, and release of the brake 24 is effected during acceleration of the vibration element 20.

A table listing correlations between the features described in the present specification and the features recited in the appended claims is shown below. It should be noted that, in the following table, each feature of the claims is not limited to the correlated feature described in the present specification. In other words, the correlated feature described in the present specification is an example of the feature of the appended claims.

TABLE 1

| Feature in the claims | Feature in the specification |
|---|---|
| First rotation shaft | First one of the input shaft 12 and the output shaft 14 |
| Second rotation shaft | The other one of the input shaft 12 and the output shaft 14 |
| Control means | Control unit 19 |
| Requirement information | Required transmission ratio and required torque ratio |
| Input means | Input interface |
| First state | State in which the clutch is engaged |
| Second state | State in which the clutch is released |
| Third state | State in which the brake is engaged |
| Fourth state | State in which the clutch is engaged (=the first state) |
| Fifth state | State in which the clutch is released (=the second state) |
| First control | Control by the control unit 19 to engage the clutch |
| Second control | Control by the control unit 19 to release the clutch |
| Third control | Control by the control unit 19 to accumulate elastic energy |
| Fourth control | Control by the control unit 19 to transmit elastic energy |

REFERENCES SIGNS LIST

10 drive power transmission device; 12 input shaft; 14 output shaft; 16 transmission member; 18 elastic member; 20 vibration element; 22 clutch; 24 brake.

The invention claimed is:

1. A drive power transmission device comprising:
a first rotation shaft configured to rotate in only one direction;
a second rotation shaft;
an elastic member having a first end and a second end, the first end of the elastic member being fixed to the second rotation shaft; and
a vibration element fixed to the second end of the elastic member, the vibration element being configured to be disposed in one of a first state of being connected to the first rotation shaft, a second state of being disconnected from the first rotation shaft, a third state of being locked to a fixed member, and a fourth state of being released from the locking to the fixed member.

2. The drive power transmission device according to claim 1, further comprising a control unit configured to perform:
a first control of placing the vibration element in the first state; and
a second control of placing the vibration element in the second state.

3. The drive power transmission device according to claim 2, wherein the control unit is configured to perform the first control in response to a velocity difference between rotational velocity of the first rotation shaft and movement velocity of the vibration element being smaller than or equal to a predetermined value.

4. The drive power transmission device according to claim 2, wherein the control unit is configured to:
perform a third control of placing the vibration element in the third state and a fourth control of placing the vibration element in the fourth state;
execute the second control after the first control;
execute the third control after the second control; and
execute the fourth control after the third control.

5. The drive power transmission device according to claim 4, wherein the control unit is configured to:
receive input requirement information denoting requirement for the first rotation shaft or the second rotation shaft, and
in response to receiving the requirement information, control any one of an amplitude of the vibration element, a period of time from execution of the first control to execution of the second control, and a period of time from execution of the third control to execution of the fourth control.

6. The drive power transmission device according to claim 5, wherein:
a rotational velocity of the second rotation shaft is higher than a rotational velocity of the first rotation shaft;
the first control is executed with respect to the vibration element when the elastic member urges the second rotation shaft in a rotation direction of the second rotation shaft, and, concurrently, the second rotation shaft receives transmission of elastic energy released from the elastic member in addition to drive power of the first rotation shaft; and
the third control is executed with respect to the vibration element when the elastic member urges the second rotation shaft in an opposite direction from the rotation direction of the second rotation shaft, and, concurrently, the second rotation shaft causes elastic energy urging in the opposite direction to further accumulate in the elastic member.

7. The drive power transmission device according to claim 5, wherein:
the second rotation shaft rotates in a direction counter to rotation of the first rotation shaft;
when the elastic member urges the second rotation shaft in an opposite direction from the rotation direction of the second rotation shaft, the vibration element is placed in the first state, and the mutually counter-rotating first rotation shaft and the second rotation shaft cause further accumulation in the elastic member of elastic energy urging in the opposite direction; and
when the elastic member urges the second rotation shaft in the rotation direction of the second rotation shaft, the vibration element is placed in the third state in which the third control is executed, and the second rotation shaft is urged in the rotation direction whereby elastic energy is released.

8. A drive power transmission device comprising:
a first rotation shaft configured to rotate in only one direction;
a second rotation shaft; and
a transmission member configured to accumulate and release elastic energy by deformation, the transmission member being fixed relative to the second rotation shaft in a shaft circumferential direction of the second rotation shaft, and the transmission member being configured to be placed in one of a first state of being connected to the first rotation shaft, a second state of being disconnected from the first rotation shaft, a third state of being locked to a fixed member, and a fourth state of being released from the locking to the fixed member.

9. The drive power transmission device according to claim 8, wherein:
the first state is a state to accumulate energy transmitted from the first rotation shaft as elastic energy in the transmission member, and
the third state is a state to transmit the elastic energy of the transmission member to the second rotation shaft.

* * * * *